COLOR TELEVISION SYSTEM

Filed April 26, 1951

10 Sheets-Sheet 1

INVENTOR
David G.C. Luck
BY
ATTORNEY

Oct. 29, 1957 D. G. C. LUCK 2,811,577

COLOR TELEVISION SYSTEM

Filed April 26, 1951 10 Sheets-Sheet 2

INVENTOR
David G. C. Luck
BY
[signature]
ATTORNEY

Oct. 29, 1957 D. G. C. LUCK 2,811,577

COLOR TELEVISION SYSTEM

Filed April 26, 1951 10 Sheets-Sheet 3

INVENTOR
David G. C. Luck
BY John J. Mitchell
ATTORNEY

INVENTOR
David G. C. Luck
BY
[signature]
ATTORNEY

INVENTOR
David G. C. Luck
BY John J. Mitchell
ATTORNEY

COLOR TELEVISION SYSTEM

Filed April 26, 1951 10 Sheets-Sheet 6

INVENTOR
David G. C. Luck
BY
ATTORNEY

INVENTOR
David G. C. Luck
BY
ATTORNEY

INVENTOR
David G. C. Luck
BY
[signature]
ATTORNEY

COLOR TELEVISION SYSTEM

Filed April 26, 1951 10 Sheets-Sheet 9

INVENTOR
David G. C. Luck
BY
ATTORNEY

INVENTOR
David G.C. Luck
BY [signature]
ATTORNEY 2,811,577

COLOR TELEVISION SYSTEM

David George Croft Luck, Princeton, N. J., assignor to Radio Corporation of America, a corporation of Delaware Application April 26, 1951, Serial No. 223,021

27 Claims. (Cl. 178—5.2)

This invention relates to improvements in apparatus for the transmission and reception of color television signals which are compatible with present black and white standards.

A color television system has been constructed in which a luminosity signal representing the apparent brightness of a scene to be televised is combined with the sidebands produced when differently phased subcarrier waves are modulated with color information. In order to save bandwidth, the frequency of the subcarrier waves may be selected to lie within the frequency spectrum of the luminosity signal. The luminosity signal may be thought of as one channel of information and each of the differently phased modulated waves of subcarrier frequency may be considered as separate channels bearing tinting signals $T_1$, $T_2$, etc. The composite signal thus created may be conveyed to a receiver by any suitable method of transmission. If it is carried as a modulation of a radio carrier, this carrier may be regarded as the main carrier and the differently phased video-frequency waves mentioned above as modulated by tinting signals may be termed a subcarrier. In discussing the present invention, it will be assumed that the luminosity signal is to be conveyed as a modulation of a main radio carrier and that the remaining information is transmitted as a modulation of the subcarrier. It will also be assumed that all elements of the system have linear response.

As used in this specification and in the following claims the terms "luminosity signal," "tinting signal" and "composite signal" will be understood to have the following meanings. The "luminsoity signal" contains only the brightness information of significant componnent colors of the televised object. As will be seen from the illustrative examples to be given, the luminosity signal may contain different proportions of the brightness information of some or all of the component colors of the object. Such a luminosity signal may be, and is, employed in a monochrome receiver to effect a black and white reproduction of the object. A "tinting signal" contains only color information of the televised object. A tinting signal contains different proportions of the color information of some or all of the component colors of the object. The number of component colors represented in a tinting signal and the proportions of these component colors will depend upon the content of the luminosity signal. The contents of the luminosity and one or more of the tinting signals are such that the combination of one or more tinting signals with the luminosity signal will produce signals representative of the brightness of the respective component colors of the object and such produced signals may be used to reproduce a color image. The content of a tinting signal also is such that the signal is zero for white or neutral gray portions of the object. A "composite signal" contains the luminosity signal and one or more tinting signals. The luminosity signal covers a frequency spectrum comparable to that of a video signal in a black and white television system. As previously indicated, the tinting signals are modulated on different phases of a subcarrier wave having a frequency within the frequency spectrum of the luminosity signal.

At a standard black and white receiver, the entire composite signal is detected and employed to control the intensity of the scanning electron beam in the kinescope. Disturbance of the black and white picture by the subcarrier is minimized since the subcarrier is made at the transmitter to shift its phase with respect to any given line in the raster by 180° on successive scans of that given line. At any given point in a line therefore, the subcarrier portion of the composite video signal adds to the luminosity signal on one scan and subtracts from it on the next scan of that line. Assuming that the scene does not change appreciably between two scans of a given line, the average intensity reproduced at a linear receiver corresponds to the luminosity signal. It is this average intensity that is seen by the eye and therefore the effects of the subcarrier do not produce any substantial interference. The standard television receiver therefore appears to respond only to the information in the luminosity channel.

At a color receiver, the composite video signal is homodyned or made to beat with differently phased waves of subcarrier frequency, each of which is in phase with one of the waves of subcarrier frequency at the transmitter. The signals recovered in this manner are combined with the luminosity signal so as to reproduce signals representative of the component colors as they occurred in the original scene.

If there is no change in the image being scanned the part of the composite video signal derived from the luminosity is identical in consecutive scans of any given line. When its modulates the differently phased homodyning waves of subcarrier frequency at the color receiver the signals produced are inverted in frequency within the lower of the sidebands produced. These frequencies reverse in phase with the subcarrier and therefore cancel visually out of the color picture in a manner similar to that described above with reference to the cancellation of the subcarrier from the black and white picture. As noted above, the subcarrier shifts in phase by 180° on two scans of a given line, and therefore the average value of the inverted frequency signal appearing at the outputs of the modulator is zero. This average signal value only is seen by the eye and, therefore, the effect made on the luminosity channel by the tinting signals recovered from the subcarrier channels is negligible.

In some previous apparatus, three differently phased, like frequency subcarirer signal waves have been employed. Each differently phased subcarrier wave at the transmitter is amplitude modulated with a signal representative solely of a different component color. It might at first appear that the homodyning action at the receiver would recover these same component color signals. However, detailed analysis given below shows that the signals recovered at the modulators in the receiver are not pure component color signals, but combinations of them. Thus, the tinting signals recovered from the subcarrier channels are not the same color signals that were originally employed to modulate the differently phased waves of subcarrier frequency at the transmitter. Signals representative of pure component colors are derived by combining the mixed tinting signals so recovered with the luminosity signal present in the luminosity signal channel.

One of the objects of this invention is to provide an improved means whereby the tinting signals employed to modulate the differently phased waves of subcarrier frequency at the transmitter are separately and directly recoverable without interaction at the receiver modulator. Such freedom from interaction between the tinting signals makes the equipment easier to operate and may be brought about in the following manner.

Whether four interdependent channels are used, as in the previous system, or whether three interdependent channels are used in accordance with the features of this invention, it is customary to locate the subcarrier in the upper part of the frequency spectrum of the luminosity channel. This expedient reduces the size of the elements of the alternating signal that must average out on successive scans of a given line. Under this condition, some of the tinting signals applied to the differently phased modulators at the transmitter may contain frequencies that produce sidebands of the subcarrier lying beyond the highest frequency in the luminosity signal channel, and therefore beyond the highest frequency passed by the transmission system. For example, if a tinting signal has a frequency of two megacycles and the subcarrier has a frequency of three megacycles, the modulation of the latter by the former produces two sideband frequencies, a lower sideband frequency of one megacycle equal to the difference frequency and an upper sideband frequency of five megacycles equal to the sum frequency. If the cut-off frequency of the transmission system is four megacycles, the upper sideband frequency of five megacycles cannot be transmitted.

The number of separately recoverable signals conveyed by a sinusoidal subcarrier or carrier, as the case may be, is, in effect, limited to the number of available sidebands. As will be apparent from a brief analysis below, when one tries to send more than this number of signals, they become mixed up with one another. This interference between one channel and another is generally termed crosstalk.

In accordance with another feature of this invention, therefore, tinting signals of frequencies that would otherwise produce crosstalk are applied to only one subcarrier phase at the transmitter. For these frequencies, only a single modulator is operative. Thus, in the range of frequencies which produce crosstalk only two channels are operative, the luminosity channel and one of the subcarrier channels. The tinting signal applied to the subcarrier channel must be such that it can be combined with the luminosity signal so as to produce signals representative of only two colors or hues. It is to be understood that both the luminosity signal and the tinting signal represent a combination of the component colors employed in the system. Thus, for example, if the component colors red and green are selected for use in the crosstalk region, both the tinting signal and the luminosity signal would be combinations of the red and green signals. If signals representative of more than two hues are applied to the two subcarrier modulators, when only one sideband is effective, the additional signal will distort the other two.

In accordance with another feature of this invention, the operation of the system is made easier if the single subcarrier modulator employed for crosstalk frequencies when only one sideband exists is modulated with the same color signals for all signal frequencies whether they are such as would produce crosstalk or not.

Briefly, this latter feature of the invention may be realized by employing only two subcarrier phases or channels in addition to the luminosity channel. A tinting signal $T_1$ that is applied to one subcarrier channel includes combinations of component color signals in ratios required to produce the two hues selected for use in the crosstalk region. The luminosity signal includes signal representative of these same component colors. A tinting signal $T_2$ is applied to the other subcarrier channel and contains only such color information as may be restricted to frequencies that do not produce crosstalk.

Thus, if the component colors, red and green only, are selected for use in the crosstalk frequency region, the luminosity signal and the tinting signal $T_1$ applied to the single subcarrier channel are derived from the signals representative of these same component colors and do not include signals derived from the blue. If, on the other hand, it is desired to employ hues of red and blue-green, all three component colors are represented in both channels. In this latter example, it would not of course be possible to separate the blue from the green components in the crosstalk region. The signals representative of the component colors blue and green are combined to represent a single hue. It is possible to select any two hues for the two-color region by suitable mixing of the three component color signals. The second tinting signal $T_2$, in the third channel, then serves to distinguish green from blue in the full-color or low frequency region.

In accordance with the latter feature of this invention, therefore, information in the crosstalk region is limited to two hues. The third hue or component color is not represented in the crosstalk region in order to eliminate crosstalk. The properties of human vision are such that loss of the third hue or color in the crosstalk region does not substantially decrease the color quality of the picture that could be obtained even if three-color information were available in this frequency region without crosstalk. The reason for this is as follows. Let us assume that a scene is comprised of a blue picket fence against a background of green foliage. As the scene is scanned by a television camera, the blue picket fence produces a low frequency in the video signals. As the camera moves back from the scene, the pickets appear to be closer together and produce higher video frequencies. At some point, as the camera moves back, the blue picket fence appears to merge into the green foliage. This corresponds to a given blue video frequency. Therefore, no advantage is derived by transmitting blue video frequencies representing areas too small for the eye to distinguish. However, if the foliage were a blue green and the picket fence an orange red, the eye could recognize the picket fence when the camera was moved considerably back from the position it had when the blue fence merged into the background of green foliage. The orange red picket fence is now producing rather high video frequencies. Therefore, if the two hues selected for transmission in the crosstalk region are orange red and blue green, the eye would not be able to distinguish between the televised image and the original scene. Although excellent results may be obtained by selecting the hues orange-red and blue-green for transmission in the crosstalk frequency region, an approximation producing good results can be obtained if the two hues are the component colors red and green.

In some previous systems, the luminosity signal contains frequencies near the subcarrier frequency, and the beating action in the receiver modulators produces low frequencies representing large areas. The large areas reproduced from these low frequencies have a tendency to flicker because the eye is less able to average over large areas than it is small areas.

Accordingly, it is another object of this invention to provide, in combination with the described selection of different colors for use in the different respective video signal frequency regions, an improved subcarrier transmitter system in which the brightness flicker produced by the luminosity signal is converted into hue flicker, which is less readily seen.

As a further feature of this invention, apparatus may be provided for use at the transmitter and receiver having intercoupling networks that can be adjusted so as to derive and reproduce signals of the type employed in the previously known subcarrier systems or in the systems functioning in accordance with the present system. Such apparatus is useful because of its extreme flexibility and ease of adjustment.

Other advantages of this invention will become apparent upon detailed consideration of the drawings in which.

Figure 3B:
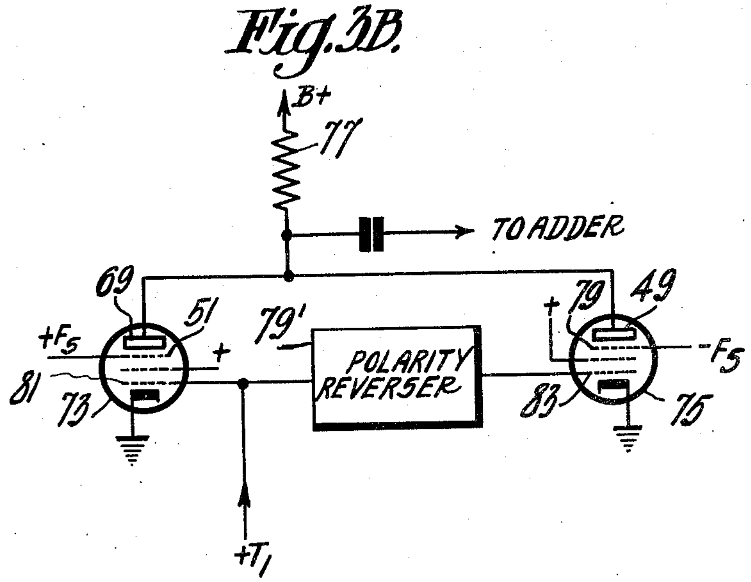
Figure 3B illustrates by circuit diagram one form of doubly balanced modulator that may be used in the transmitter of Figure 3.
Figure 3:
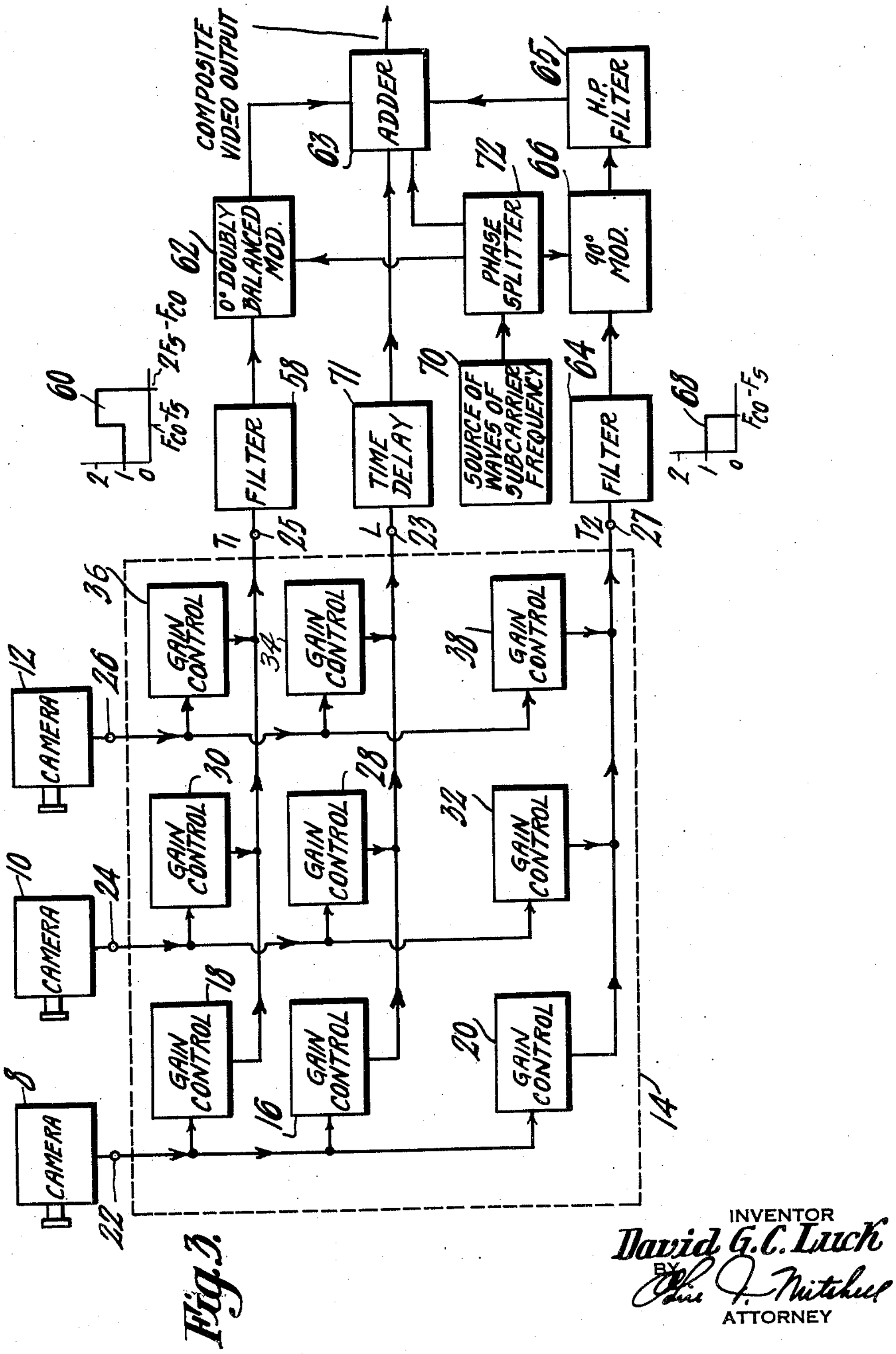
Figure 3 illustrates by block diagram a color television transmitter employing the principles of this invention and provided with an intercoupling network such that the results obtained by known subcarrier systems as well as the results obtained by this invention may be reproduced.
Figure 4:
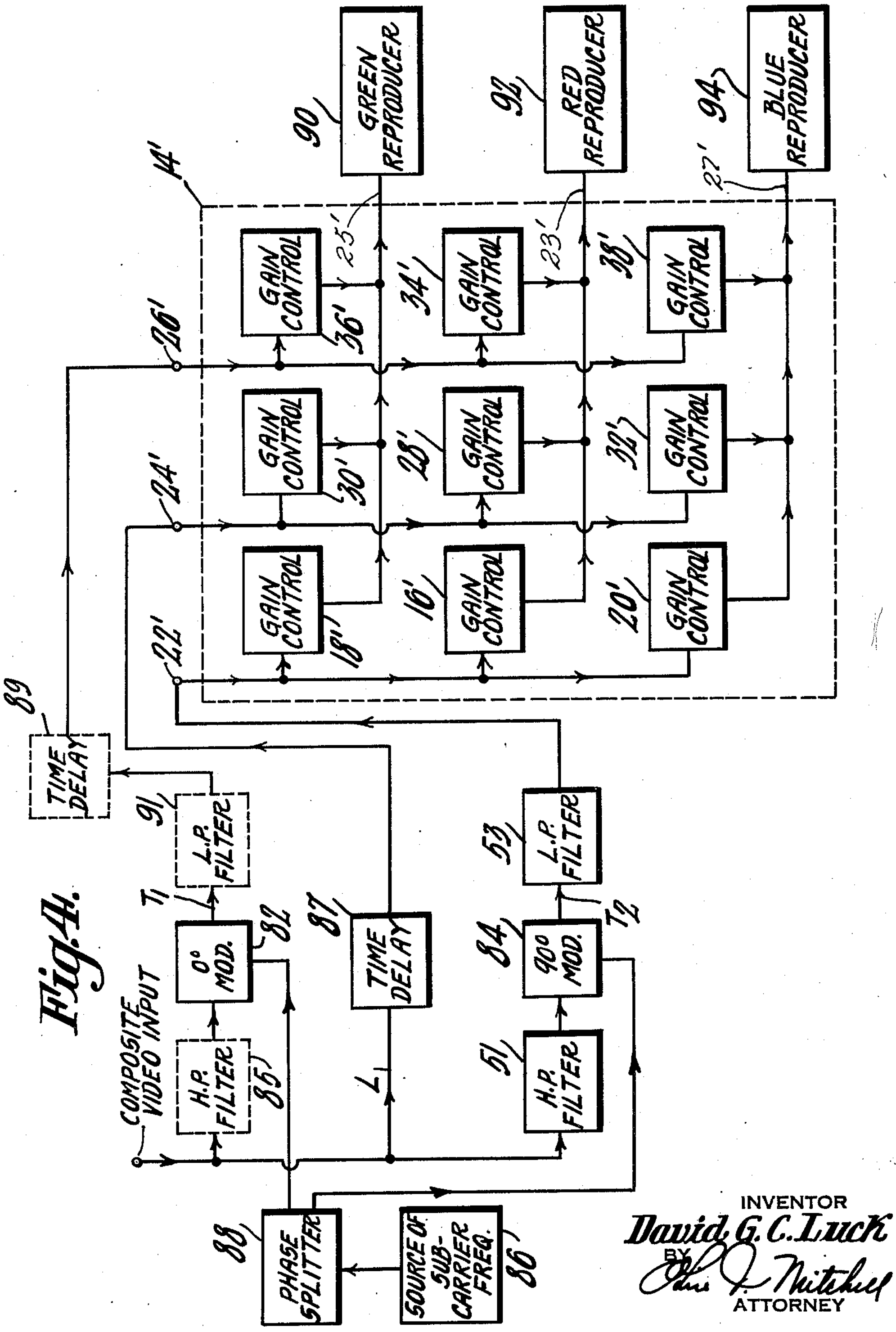
Figure 4 illustrates by block diagram a receiver adapted to reproduce color images from signals transmitted by transmitter of Figure 3 and having an intercoupling network similar to that shown in Figure 3A.
Figures 5, 5A:
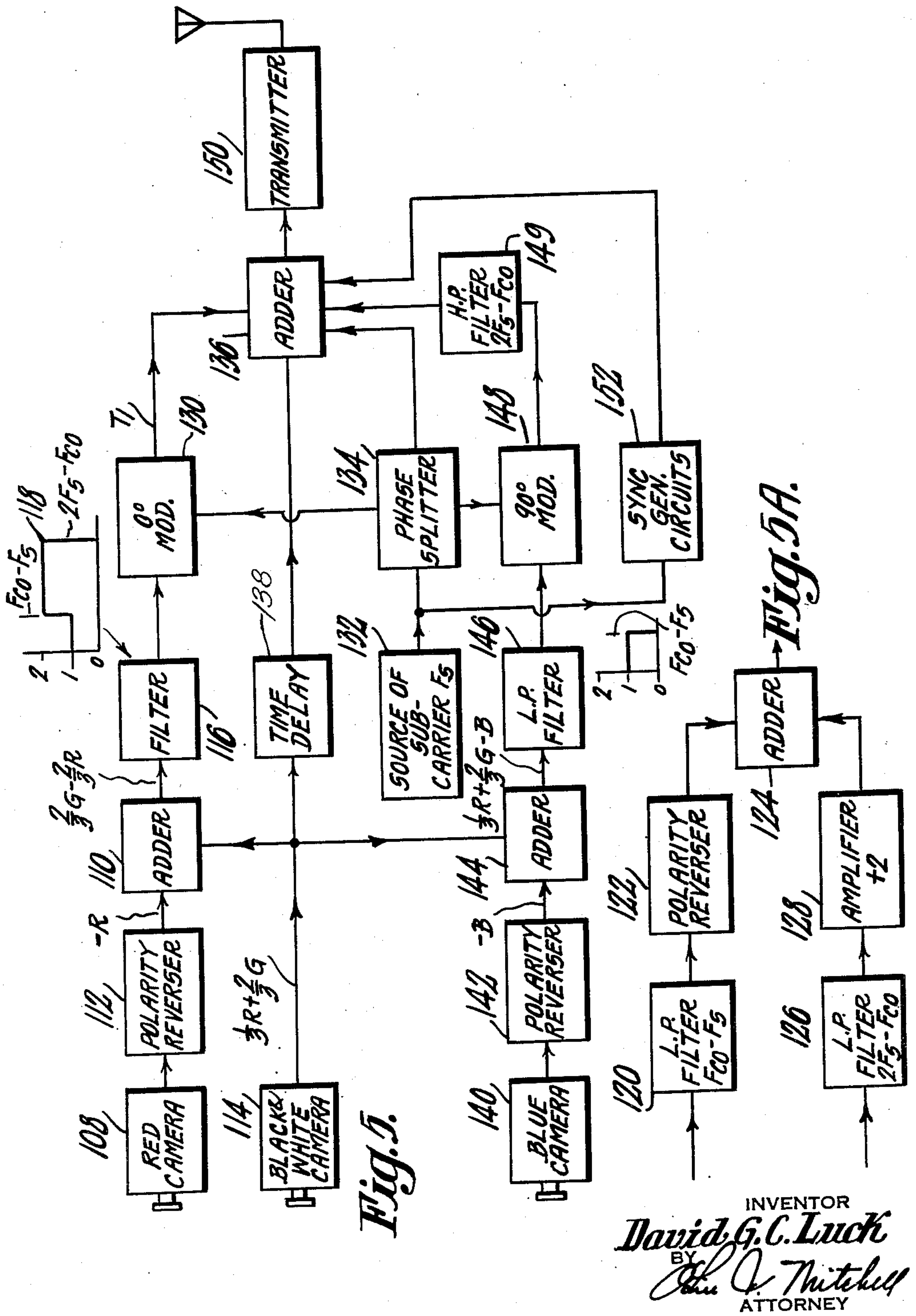
Figure 5 illustrates by block diagram an embodiment of this invention wherein the luminosity signal represents red and green only and wherein the two colors employed in the crosstalk region are red and green.
Figure 6:
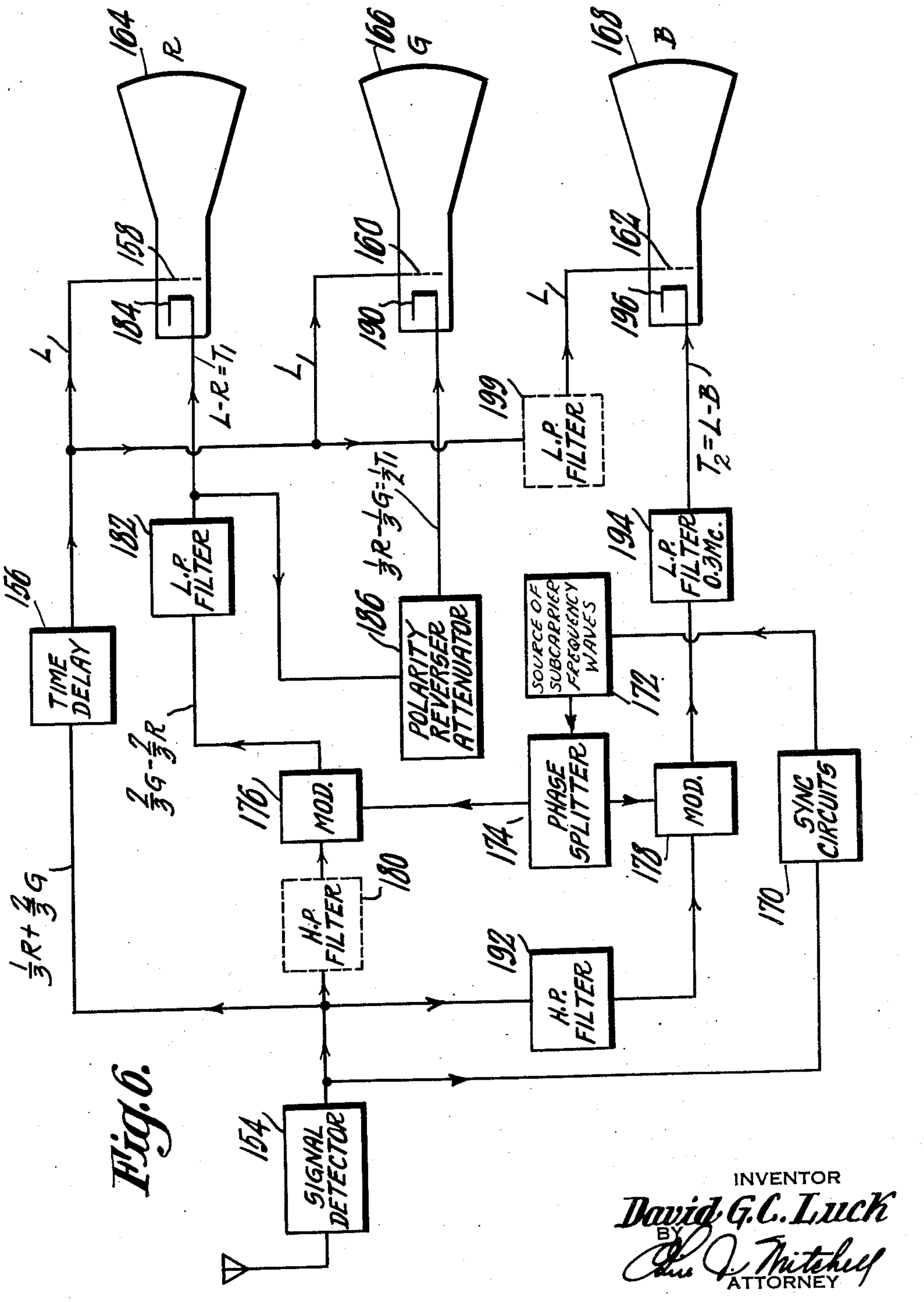
Figures 7A, 7B:
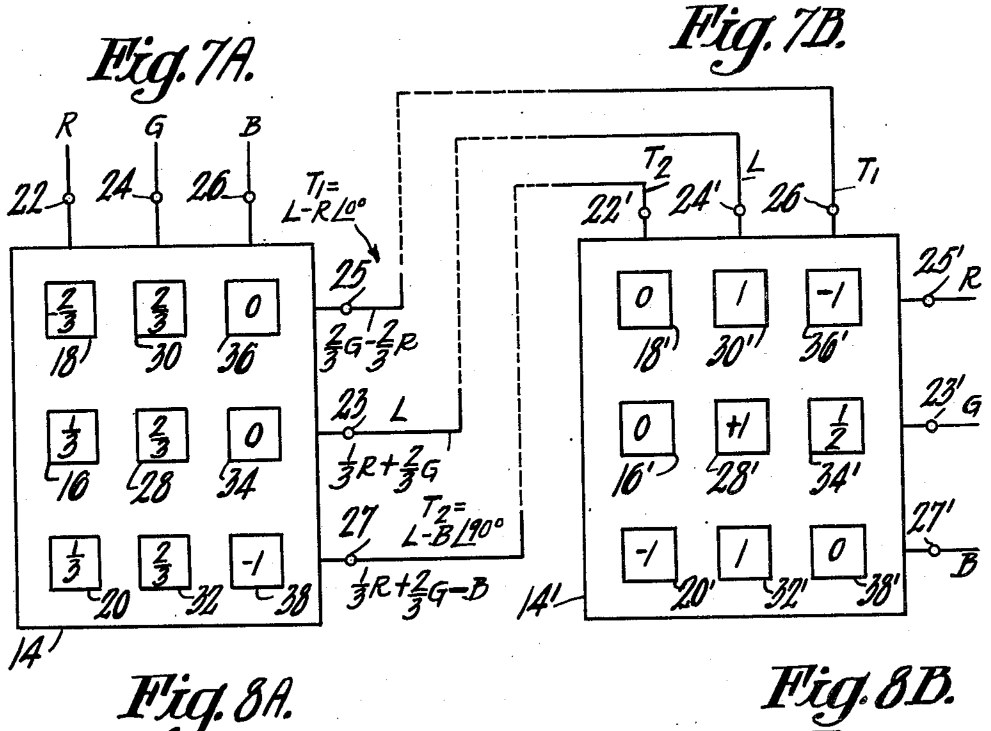
Figures 8A, 8B:
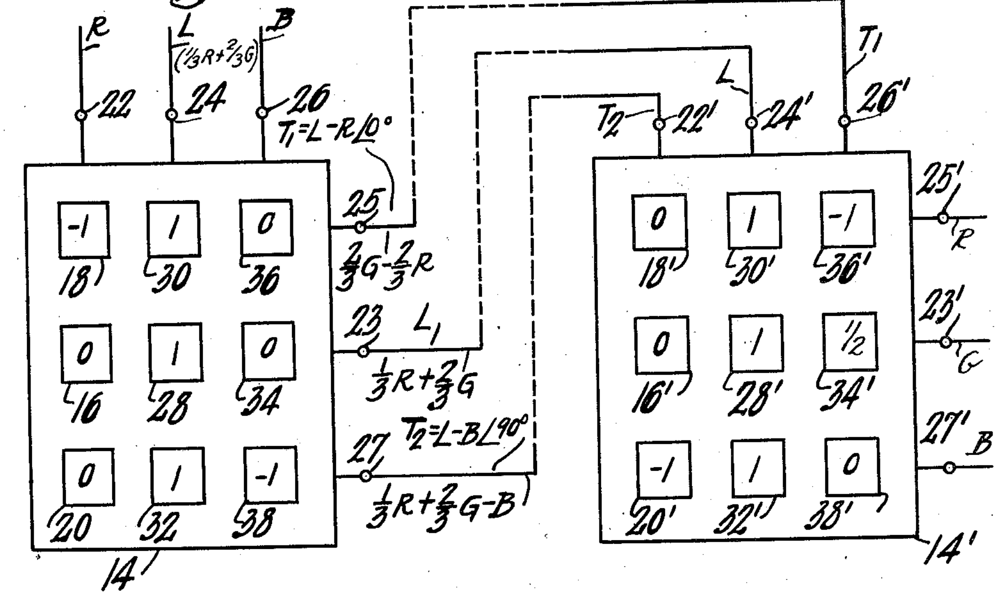
Figure 9:
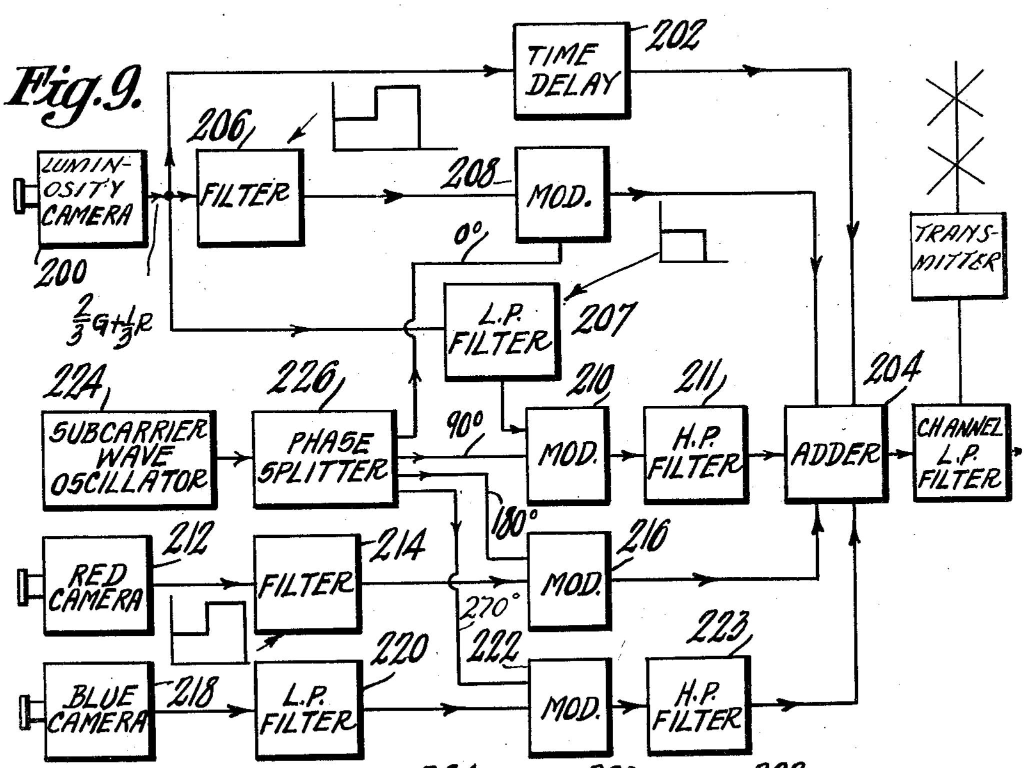
Figure 10:
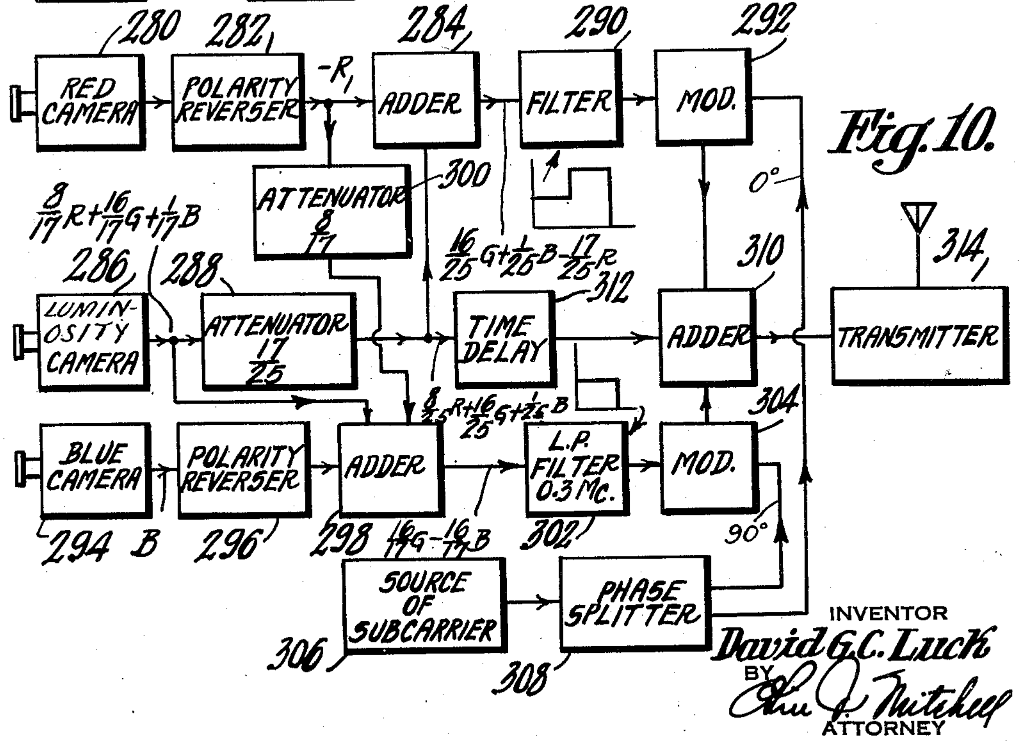
Figure 11:
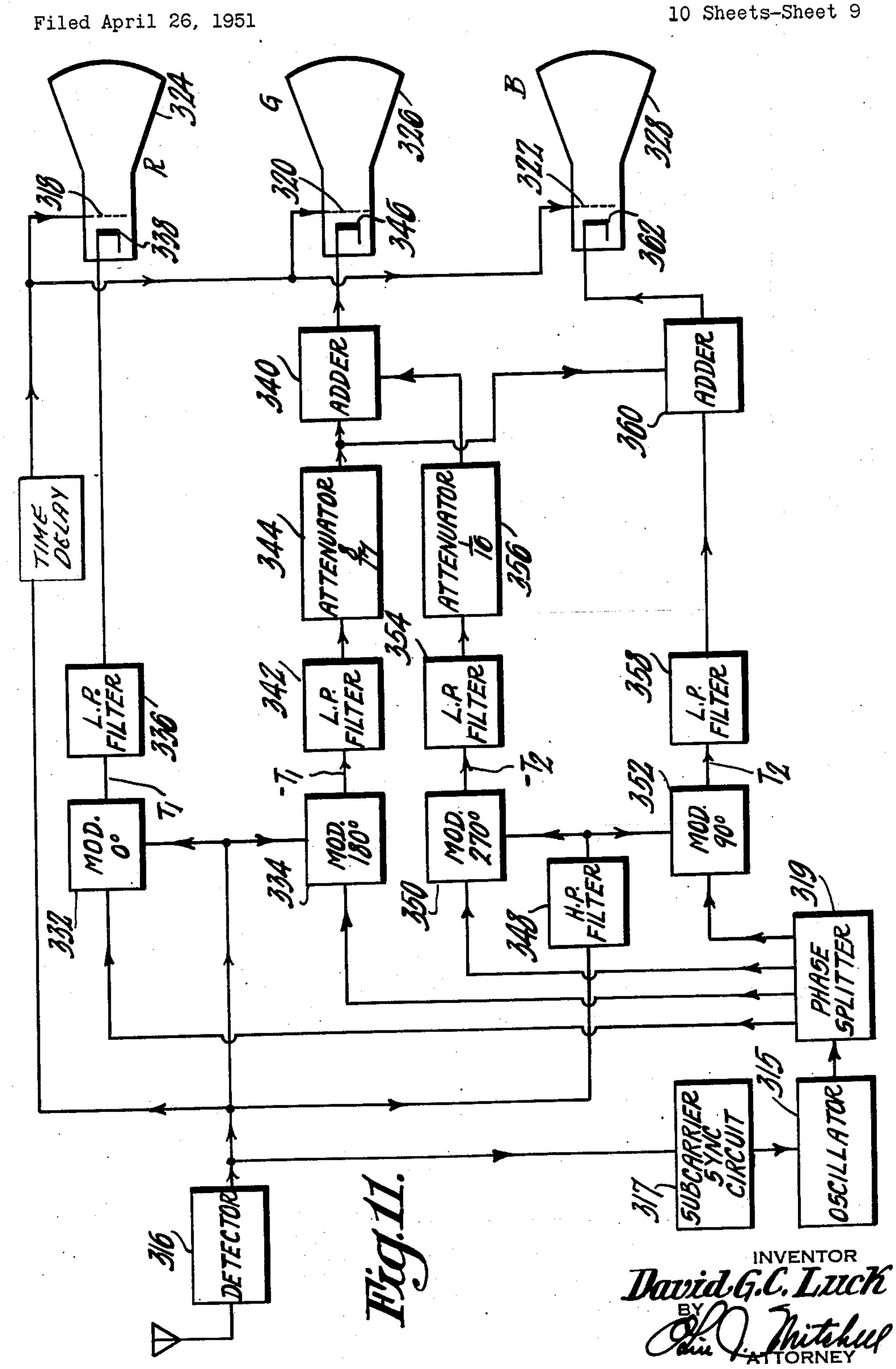
Figure 12:
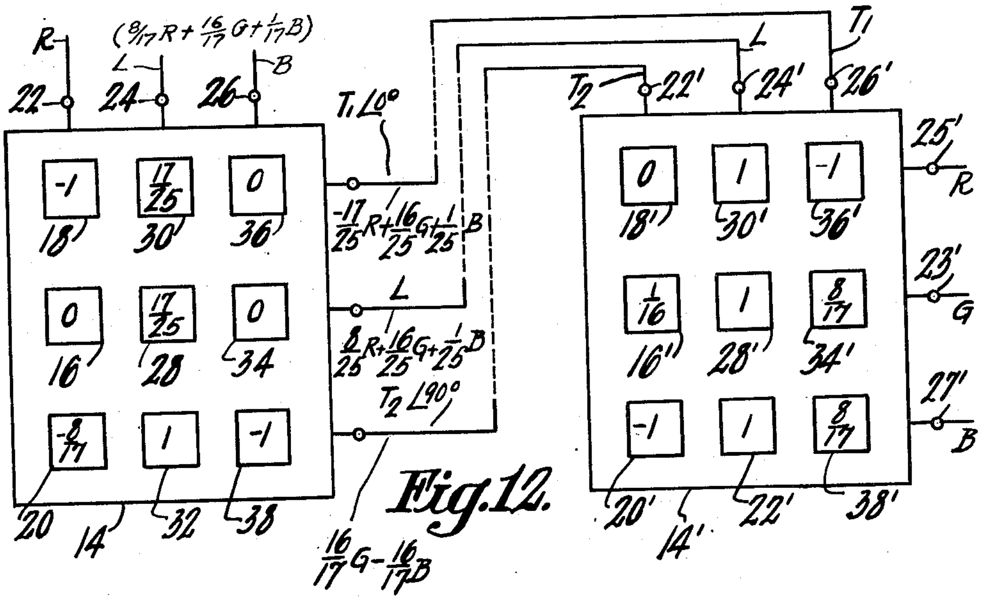
Figure 13:
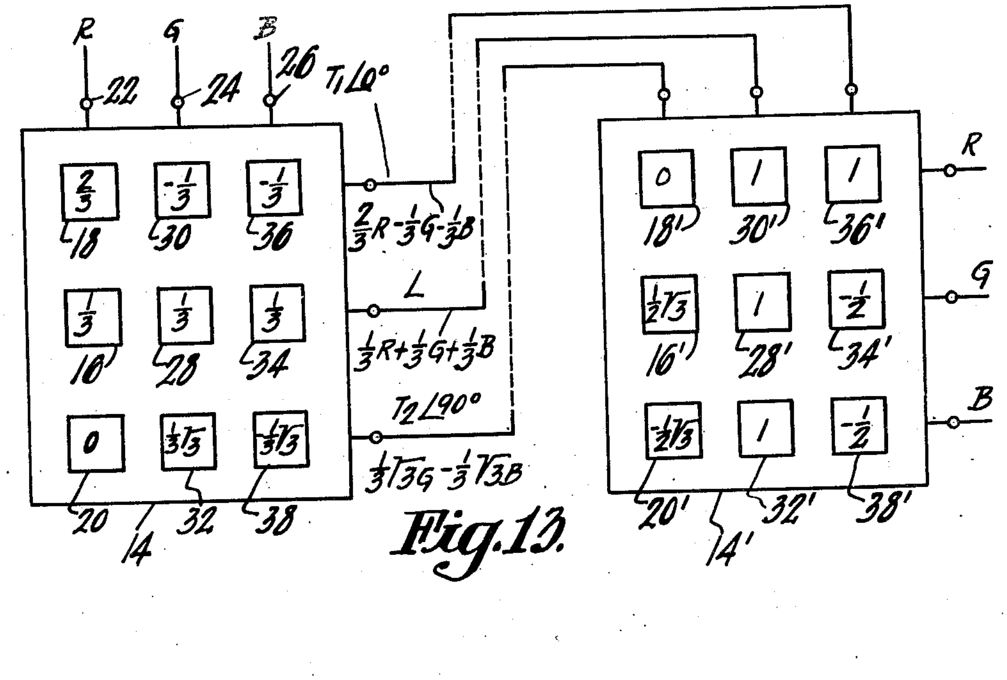

Figure 5A also illustrates by block diagram the manner in which certain of the filters in the transmitter of Figure 5 may be constructed;

Figure 6 illustrates in block diagram form a receiver adapted to reproduce colored images from signals that are transmitted by the transmitter of the type shown in Figure 5;

Figures 7A and 7B illustrate by block diagram the settings of the intercoupling networks of the transmitter of Figure 3 and the receiver of Figure 4, respectively, so as to produce the same results obtained by the embodiment of the invention illustrated by the transmitter of Figure 5 and the receiver of Figure 6, when the input signals to the intercoupling network at the transmitter are the pure component color signals;

Figures 8A and 8B illustrate by block diagram the settings of the gain controls in the intercoupling networks of the transmitter of Figure 3 and the receiver of Figure 4, respectively, in order to obtain, in the case where one of the input signals to the intercoupling network is a luminosity signal, substantially the same results as are given by the embodiment shown in Figures 5 and 6;

Figure 9 illustrates in block diagram form a different manner in which signal mixing may be done in an embodiment of this invention, so as to transmit the same type of signal transmitted by the transmitter of Figure 5;

Figure 10 illustrates in block diagram form a slightly different embodiment of this invention wherein the luminosity signal takes into account the blue light in a scene and wherein the two-color information in the single sideband region is red and blue-green;

Figure 11 illustrates in block diagram form a receiver adapted to reproduce two-color information in a single sideband region in red and blue-green from the signals conveyed by the transmitter of Figure 10 and trichromatic information in the low frequency region;

Figure 12 illustrates the settings of the intercoupling networks of the transmitter of Figure 3 and the receiver of Figure 4, when the signals supplied to the intercoupling network at the transmitter represent red, blue and luminosity, in order to transmit signals that are the same as those transmitted by the transmitter of Figure 10 and in order to reproduce from those signals a colored image in the same way as the receiver of Figure 11;

Figure 13 illustrates by block diagram the versatility of the intercoupling networks of the transmitter of Figure 3 and the receiver of Figure 4 by showing how the settings of the gain controls therein may be so adjusted as to reproduce the properties of a known system wherein the three component colors are sampled at 120° intervals.

In accordance with well established homodyning principles, when an amplitude modulated carrier having two equal sidebands is made to beat with an unmodulated carrier of like phase and frequencies, the signals producing the modulation are recovered with their original polarity. If the phase of either wave is reversed, the signal recovered by detection has opposite polarity. If the relative phase between the modulated and unmodulated subcarrier waves is 90°, there is no detected signal output. Thus, the signal derived from homodyning decreases in amplitude to zero as the relative phase of the modulated and unmodulated carriers is shifted from an in phase position to a 90° phase position and the derived signal increases from zero to a maximum negative amplitude, as the relative phase of the carriers changes from 90° to 180°.

The following analysis shows in more detail the way in which quadrature phase modulation makes possible the recovery of tinting signals at the receiver that are identical to the tinting signals employed at the transmitter. This discussion assumes ideal modulators which are devices which form an output signal that is solely the product of two input signals. Such an ideal modulator is usually referred to as doubly balanced. The inputs to the $T_1$ modulator at the transmitter are $T_1$ and cos $\omega t$. With respect to distance along a given line, the output signal from the modulator may be represented by $\pm$ cos $\omega t$. It will be appreciated that the $\pm$ is the effective phase reversal occurring on two consecutive scans of a given line as described above. Therefore, the following equations represent electrical signals along a given line of a television raster with the $\pm$ indicating the effect of the phase reversal with respect to a fixed point along the given line. The total transmitted (i. e. composite) signal "S," formed by adding a luminosity signal "L" and the outputs of the two quadrature phased modulators is $$S=L\pm T_1 \cos \omega t \pm T_2 \sin \omega t \qquad (1)$$

When this signal is applied to the $T_1$ modulator at the receiver along with subcarrier $\pm$ 2 cost $\omega t$, the resulting output is $$T_{1R}=\pm 2S \cos \omega t= \pm 2L \cos \omega t+2T_1 \cos^2 \omega t+2T_2 \sin \omega t \cos \omega t \qquad (2)$$

By well known trigonometric relations, this is exactly $$T_{1R}=T_1+T_1 \cos 2\omega t+T_2 \sin 2\omega t \pm 2L \cos \omega t \qquad (3)$$

The second and third terms, representing sidebands of the second harmonic of the subcarrier, are easily removed by filters, while the last term, because of its alternating sign is averaged to zero by the eye. This leaves a significant output $T_{1R}$ from the receiver modulator which just reproduces the original tinting signal $T_1$ applied to the corresponding transmitter modulator, without being affected by the second tinting signal. Similar reasoning applies to the operation of the $T_2$ or second tinting signal channel.

If instead of using quadrature phasing, three color signals "R," "B," and "G" are used respectively to modulate at a transmitter three subcarrier signals of phases 0°, 120°, and 240°, in accordance with prior proposed systems, the composite transmitted signal becomes $$S'=L\pm R \cos \omega t \pm B \cos (\omega t-120°) \pm G \cos (\omega t-240°) \qquad (4)$$

Using the usual trigonometric expressions for functions of the difference of two angles, this expression for the composite signal reduces to just $$S'=L\pm(R-\tfrac{1}{2}G-\tfrac{1}{2}B) \cos \omega t \pm (\tfrac{1}{2}3\sqrt{G}-\tfrac{1}{2}\sqrt{3}) \sin \omega t \qquad (5)$$

When this is applied to the zero-degree phase modulator at the receiver, there is recovered a tinting signal $$T_{1R}=\pm 2S' \cos \omega t-R-\tfrac{1}{2}G-\tfrac{1}{2}B+(R-\tfrac{1}{2}G-\tfrac{1}{2}B) \cos 2\omega t+(\tfrac{1}{2}\sqrt{3}-\tfrac{1}{2}\sqrt{3B}) \sin 2\omega t \pm 2L \cos \omega t \qquad (6)$$

just as in the case discussed above. The useful tinting signal recovered from the zero-degree channel at the receiver in this case is thus $R-\frac{1}{2}G-\frac{1}{2}B$, and by no means only the red signal aplied to the zero-degreee modulator at the transmitter. Similar results are found for the 120° and 240° phase receiver channels.

If the signals "R," "G," and "B" are equal as for a neutral gray subject it is immediately evident from Equation 6 that the signal $T_{1R}$ falls exactly to zero, as it should do (except for the term $\pm 2L \cos \omega t$, which averages to zero visually). This is a property of all subcarrier channels discussed in this specification.

Figure 1:
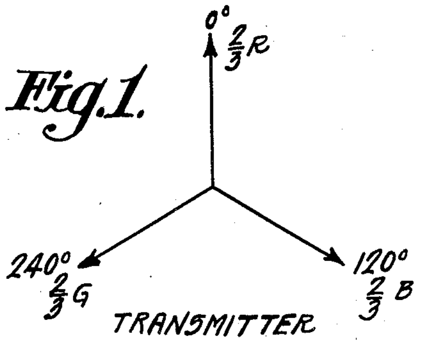
Figures 1 and 1A are vector diagrams illustrating the operation of a known system of color television.

The absence of interaction between the modulations of subcarriers in phase quadrature with one another can be realized by noting that the projection of one vector on the other is zero. Vectors may also be used to explain why homodyning of modulations that are not in phase quadrature produce signals at a receiver that are not the same as those used to modulate similarly phased waves of subcarrier frequency at the transmitter and are therefore interdependent. Assume, as illustrated in Figure 1, that a reference of zero-degree phased subcarrier-frequency signal is modulated at the transmitter with a pure red video signal at ⅔ amplitude, that a 120° phase of the subcarrier frequency is modulated with a pure blue signal at ⅔ amplitude and that a 240° phase of the subcarrier frequency is modulated with a pure green signal at ⅔ amplitude. The combination of these modulations forms the transmitted subcarrier signal. For gray subject matter, the three vectors shown are equal, and the resultant amplitude of the subcarrier is obviously zero. In a colored scene, however, the vectors will have different lengths and thus have a finite resultant which is the transmitted subcarrier signal.

Figure 1A:
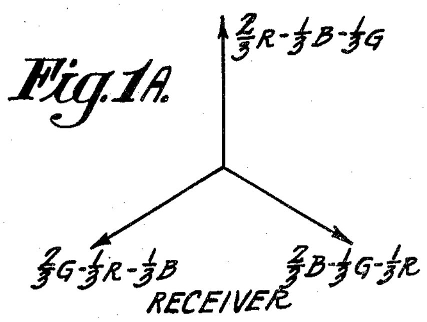

When the transmitted subcarrier is made to beat in a receiver with an unmodulated carrier of 0° phase, as indicated in Figure 1A, the ⅔R signal is detected in positive polarity. In addition, the beating action detects the component of the $$2/3B\underline{/120^\circ} \text{ vector}$$

along the same line as the ⅔R signal. Since this projection is of one half amplitude and lies in the opposite direction from the 0° vector, a signal equal to —⅓ B is also detected. In a similar way, a signal of —⅓G is also detected. Thus, the output of the 0° phase modulator at the receiver is not the pure red signal with which the 0° phase of the wave of subcarrier frequency was modulated at the transmitter, but a signal represented by the expression $\frac{2}{3}R-\frac{1}{3}B-\frac{1}{3}G$. In the same way, the 120° phase modulation provides a signal $\frac{2}{3}B-\frac{1}{3}G-\frac{1}{3}R$ and the 240° phase modulation provides a signal $$\tfrac{2}{3}G-\tfrac{1}{3}R-\tfrac{1}{3}B$$

This graphical result is evidently the same as was reached above by analytical methods.

The discussion thus far has primarily been concerned with the operation of a subcarrier system for video signal frequencies that are represented by three channels, the luminosity channel and two modulated subcarrier channels. The following discussion relates to the input frequencies that are represented by only two channels, the luminosity channel and one sideband of the subcarrier. In order to properly distinguish the portion of the video spectrum that is represented by three channels from the portion of the video spectrum represented by only two channels, reference is made to Figure 2. The cut-off frequency of the luminosity or video channel is shown as $F_{co}$ and the subcarrier frequency $F_s$ is shown as less than $F_{co}$. Those original video frequencies within the band A, which has an upper frequency equal to $F_{co}-F_s$ are represented (in addition) by two sidebands of the subcarrier $F_s$. These upper and lower sidebands $A'_U$ and $A'_L$ respectively are located on opposite sides of the subcarrier frequency $F_s$ and the frequency range of each is equal to the video frequency band A. However, those video frequencies lying within the band B, which has an upper frequency equal to $(2F_s-F_{co})$ [which is $F_s-(F_{co}-F_s)$], produce a sum frequency (i. e. upper side band), when they are used to modulate a wave of frequency $F_s$, that lies in part beyond $F_{co}$ and therefore cannot be transmitted in its entirety. Only the indicated part $B'_U$ of this upper sideband can be transmitted. The difference frequency produced by the modulation of the subcarrier with video signals within the band B is a lower sideband $B'_L$ which can be transmitted in its entirety. It is seen that the transmitted upper sideband $B'_U$ has the same frequency range as the upper sideband $A'_U$ and as the video signal band A. Those video signals in the band B lying between frequencies $(F_{co}-F_s)$ and $(2F_s-F_{co})$ are the ones producing the untransmitted part of the upper sideband of the subcarrier modulated by signals in band B. This band of frequencies is designated CT in Figure 2, since signals in this band would produce crosstalk with signals in band A.

If a tinting signal $T_1$ having components in the video band A is applied so as to modulate a wave of subcarrier frequency having 0° phase, the resultant of the double sidebands such as $A'_U$ and $A'_L$ is a wave of subcarrier frequency at zero degree phase that varies in amplitude in accordance with the video tinting signal $T_1$. If a tinting signal $T_2$ in video band B and having similar frequencies in the video band A is applied to a wave of subcarrier frequency having a phase angle of 90°, the resultant of the double sidebands is a wave of subcarrier frequency at a 90° phase, that varies in amplitude in accordance with the video tinting signal $T_2$. Because the phases of the modulated subcarrier wave are in quadrature and are fixed and known, the signals $T_1$ and $T_2$ producing the double sidebands can be separately recovered by homodyning methods, as discussed above.

However, for higher video frequencies in the crosstalk band CT, where only a lower sideband, corresponding to $(B'_L-A'_L)$ of the subcarrier is transmitted, differently phased modulated waves of subcarrier frequency are no longer in full existence and therefore cannot be separately recovered. The lower sideband portion $(B'_L-A'_L)$ derived from the 0° phase modulator then becomes inextricably mixed up with the lower sideband portion $(B'_L-A'_L)$ of the 90° phase modulator. Thus, if a tinting signal $T_1$ in the video crosstalk band CT is applied to the 0° phase modulator and a tinting signal $T_2$ in the video crosstalk band CT is applied to the 90° phase modulator, these signals cannot thereafter be separately identified. If, however, only one tinting signal has video frequencies in the crosstalk band CT that produce but a single sideband portion $(B'_L-A'_L)$, then there is no need to separate two tinting signals and anything detected in this frequency region can only come from that one tinting signal.

Figure 2:
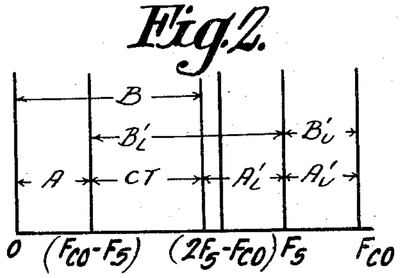
Figure 2 illustrates graphically the video frequencies for which two subcarrier channels exist and also those frequencies for which only one subcarrier channel exists.

From the foregoing description with reference to Figure 2, it is seen that for color-representative signals in the video band A a three channel system is provided and for color-representative signals in the video crosstalk band CT a two channel system is provided. In both of these cases, one channel conveys a luminosity signal which may have frequencies ranging from 0 to $F_{co}$. In the case of color video signals in band A, the other two channels are provided by the modulation of two quadrature phased subcarrier waves with tinting signals $T_1$ and $T_2$ having frequencies within band A so as to produce two sidebands $A'_L$ and $A'_U$ of the subcarrier waves. In the case of color video signals in band CT, the second channel is provided by the modulation of a single phase subcarrier wave with one of the tinting signals having frequencies within band CT so as to produce the single sideband corresponding to $(B'_L-A'_L)$ of the subcarrier wave. For convenience in the following portions of the specification and in the claims the color video signal band A will be referred to as the "crosstalk free frequency range" since, as described, two independent tinting signals within this frequency spectrum can be transmitted and separately recovered without interaction. Similarly, the color video signal band CT will be referred to as the "crosstalk frequency range" since two independent tinting signals within this frequency spectrum cannot be transmitted and separately recovered without interaction (i. e. crosstalk).

In the symmetrical three-phase system, discussed above, and illustrated in Figure 1, wherein each of the modulators is modulated with signals representative of one component color alone, it might at first appear that satisfactory results could be obtained by using only a single modulator in the crosstalk range. However, the color receiver should be capable of reproducing more than just a single color in this range. Suppose that the 240° phase channel of Figure 1 is the only operable one in the crosstalk range. At the transmitter this is modulated, as shown in Figure 1, with signals representative of green only. When all three channels at the receiver were operating, the 240° phase channel at the receiver provided a signal equal to $\frac{2}{3}G-\frac{1}{3}R-\frac{1}{3}B$. However, in this example, the red and blue crosstalk range frequencies are not applied to their respective modulators at the transmitter, and no output is taken from the corresponding modulators at the receiver. Therefore, the 240° phase channel at the receiver provides a pure green signal in the crosstalk range. If the brightness signal is panchromatic, the addition of the pure green to it does not produce a signal equal in amplitude to the original green. Instead, because the crosstalk frequency of red and blue components of the brightness signal are not present in the 240° phase modulator outputs at the receiver, there is nothing to cancel out the red and blue components in the brightness signal. The resultant green light produced is therefore controlled in accordance with some red and blue signals and is therefore too large.

In order that this invention may be more easily understood, certain conventional portions of the transmitters and receivers, such as the synchronizing, level setting and sweep circuits, etc., have been omitted.

Figure 3 illustrates in block diagram form a transmitter in accordance with this invention that is capable of being operated so as to produce the signals that would be produced by any type of subcarrier transmission, either the 120° symmetrically phased transmission or the 0° and 90° phased transmission.

The standard pick-up cameras 8, 10, and 12 supply video signals representing three different sets of selected component color information to different inputs 22, 24 and 26 of an intercoupling network or "masking amplifier" enclosed within the dotted rectangle 14. Between each of these inputs and each of three outputs 23, 25 and 27 of the intercoupling network 14, there is connected a gain control device.

In this way, signals from any one of the video cameras 8, 10, or 12 can be combined in desired amplitude and polarity with the signals from any of the other cameras, and three such combinations may be set up independently. As the diagram is drawn, the gain control devices 16, 18, and 20 control the amount of video signals supplied by the camera 8 that is permitted to arrive at the output terminals 23, 25 and 27 respectively. In a similar way, the gain control devices 28, 30 and 32 control the amount of video signal that is permitted to reach the output terminals 23, 25 and 27 from camera 10. The gain control devices 34, 36 and 38 control the amount of video signal that is permitted to reach the output terminals 23, 25 and 27 from the camera 12. The signal thus applied to the output terminal 25 may be termed the tinting signal $T_1$ and the signal at the output terminal 27 may be termed the tinting signal $T_2$.

The gain controls of the intercoupling network 14 are so adjusted that a luminosity signal L, substantially representative of apparent brightness, appears at the output terminal 23. This is the signal which is to reproduce black and white images in standard receivers. The luminosity signal, L, may be transmitted in a manner substantially the same as a conventional black and white television signal. Since the luminosity is not passed through any modulator before the main carrier modulator of the transmitter, this signal is suitable for reproducing black and white images on a standard black and white television receiver.

The output terminal 25 of the intercoupling network 14 on which the tinting signal $T_1$ appears is connected to a low-pass filter 58 having a characteristic such as indicated by the graph 60, wherein those frequencies of the signal $T_1$ lying within the crosstalk free video frequency band A (Figure 2) are supplied at unity amplitude to a doubly balanced modulator 62 and the frequencies lying within the crosstalk video frequency band CT (Figure 2) are supplied to the doubly balanced modulator 62 at a relative amplitude of two units. The modulator 62 is doubly balanced so that only the sidebands of the modulated subcarrier will appear in its output. The increased amplitude in the crosstalk frequency region CT of video band B (Figure 2) is necessary because these frequencies of $T_1$ are only present in one sideband whereas the frequencies below this region in the crosstalk free video band A (Figure 2) are carried by both subcarrier sidebands. The output of the doubly balanced modulator is applied to an adder 63.

The tinting signal $T_2$ at the output terminal 27 of the intercoupling network 14 are coupled via a low-pass filter 64 having a response only in the crosstalk free band A (see Figure 2) to an unbalanced modulator 66. The frequency versus amplitude characteristic of the low-pass filter 64 is indicated by a graph 68 wherein it will be noted that the frequencies within the band A (Figure 2) that are passed by this filter have a relative amplitude of unity. The output of the unbalanced modulator 66 is coupled to the adder 63 via a high-pass filter 65 having a lower frequency limit only slightly less than that necessary to pass the two side bands $A'_L$ and $A_U$ (Figure 2). No frequency passed by filter 64, going directly through the simple modulator 66 can then pass the filter 65.

Waves of subcarrier frequency are supplied to the modulators 62 and 66 and the adder 63 by a source 70 via a phase splitter 72. The phase splitter 72 may be of any standard design capable of furnishing 0° or reference phase waves to the modulator 62, 90° phase waves to the modulator 66 and 270° phase waves to the adder 63.

In order that the homodyning operation at the receiver may be properly synchronized with the modulated subcarrier at the transmitter, some of the output of the source 70 may be selected and placed on the back porch of the horizontal blanking pulse in a manner amply described in a copending U. S. patent application of A. V. Bedford, Serial No. 143,800, filed February 11, 1950, and titled "Synchronizing Apparatus." The details of this synchronizing system are not essential to an understanding of this invention and are therefore not included.

Figure 3A:
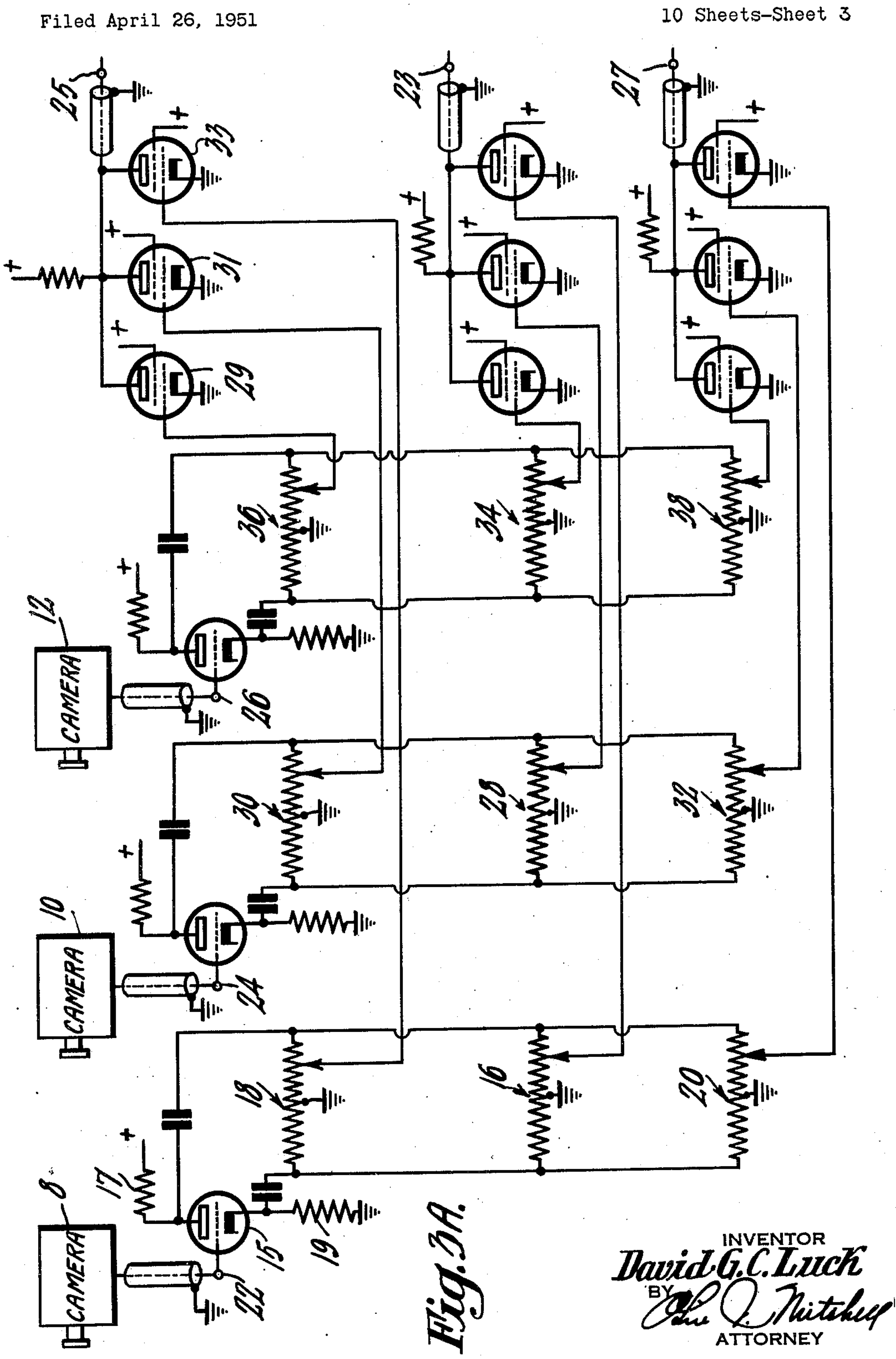
Figure 3A illustrates by circuit diagram one form that the intercoupling network of the transmitter of Figure 3 may take.

Figure 3A illustrates one form the intercoupling network 14 of Figure 3 may assume. The terminal 22 is connected to a control grid of a triode 15 having a resistor 17 connected in its plate circuit and a resistor 19 connected in its cathode circuit. The plate of the triode 15 is coupled to one side of each of three gain control devices 16, 18, and 20 which may be potentiometers, and the cathode of the triode 15 is coupled to the other ends of the potentiometers. The central points of these potentiometers are grounded so that the video signal appearing at the input terminal 22 is reproduced with regative polarity at the right-hand side of the potentiometers and with positive polarity at the left-hand side. Signals from the input terminals 24 and 26 are treated in a similar manner. Corresponding potentiometers 18, 30 and 36 are connected to the control electrodes of different adding ampligers 29, 31 and 33. The amplifiers have a common load impedance so that the voltage produced across it at the output terminal 25 is proportioned to the sum of the signals supplied by the potentiometers.

Figure 3B illustrates one form that the doubly balanced modulator of Figure 3 may assume. The plates 69 and 49 of two pentodes 73 and 75 respectively are coupled to B+ via a common load impedance which is illustrated as being a resistor 77. The suppressor grids 51 and 79 of the pentodes 73 and 75 are fed with oppositely phased waves $+F_s$ and $-F_s$ of subcarrier frequency. The control grid 81 of the pentode 73 is fed directly with the signal $+T_1$ and the control grid 83 of the pentode 75 is fed with the signal $-T_1$ via a polarity reverser 79'. The control grid 81 is coupled to the output of the filter 58 of Figure 3 using a D.-C. restorer. The cathodes are grounded.

As modulation is a multiplication process, a wave of subcarrier frequency $+F_s$ and a video signal $+T_1$ are multiplied together in the modulator 73 and a wave of subcarrier frequency $-F_s$ and a video signal $-T_1$ are multiplied together in the modulator 75. The products of modulation, i. e. the side bands of the subcarrier waves produced by the pentodes 73 and 75, are of identical polarity, as the multiplication of two positive quantities yields a positive quantity and the multiplication of two negative quantities also yields a positive quantity. However, inasmuch as the waves of subcarrier frequency $F_s$ and the video signals $T_1$ are each applied to the two pentodes in opposite polarity, direct transfer of both of them to the output of the pentodes cancels out. Hence, only the products of modulation, i. e. the sidebands of the subcarrier frequency reach the output terminal of the modulator that is connected to their plates.

The modulator 66 of Figure 3 could be a doubly balanced modulator as shown in Figure 3B, but inasmuch as the video signal $T_2$ is limited to a frequency that is less than ½ $F_s$ by the filter 64, it is easier to prevent $T_2$ from reaching the adder 63 by use of the high-pass filter 65. For example, if $F_s$=3.6 mc. and $F_{co}$=3.9, then the highest frequency passed by the filter 64 is 0.3 mc. and the lowest frequency passed by the high-pass filter 65 is 3.3 mc. and therefore the video signal $T_2$ is prevented from reaching the adder 63. The 90° phase wave of subcarrier frequency can pass through the high-pass filter 65 to the adder 63, but it will be properly balanced in the adder 63 by the presence of a 270° phase wave of subcarrier frequency, supplied to the adder 63 from the phase splitter 72. The modulator 66 is biased so that when $T_2$ is zero, the amplitude of the carrier waves reaching the adder 63 exactly balances the amount of 270° phase waves of subcarrier frequency supplied to the adder 63 by the phase splitter 72.

This same method of balancing out carrier could be applied to the modulator 62. In this case, the waves of subcarrier frequency supplied to the adder 63 by the phase splitter 72 would be of 225° phase so as to cancel out the resultant subcarrier of 45° phase that is introduced into the adder 63 by the two modulators. If one were willing to limit the upper frequency of the two color information carried by the signal $T_1$ to less than one-half the subcarrier frequency $F_s$, passage of direct video could be blocked by paired low and high pass filters here also. Modulator 62 would then not need to be balanced at all; in the example of Figure 3B, pentode 75 might then be omitted.

The output of the 0° phase modulator 62 and the 90° phase modulator 66 are combined with the luminosity signal in an adder 63 so as to form a composite signal that is then transmitted in any desired manner. A time delay device 71 may be connected between the intercoupling network terminal 23 and the adder 63 in order to compensate for the delay introduced by the filters 58, 64, and 65.

In the transmitter of Figure 3, only the tinting signal $T_1$ contains video frequencies that produce but a single side band of the subcarrier as the filter 64 prevents these frequencies from reaching the $T_2$ modulator 66. The various gain controls in the intercoupling network 14 at the transmitter must be so adjusted that the luminosity signal L as supplied to the adder 63 by the time-delay network 71 may be combined at a receiver with the recovered tinting signal $T_1$ alone so as to produce the two-color information required in the crosstalk frequency band CT as illustrated in Figure 2. At the same time, the luminosity signal must be related to both of the recovered tinting signals $T_1$ and $T_2$ in such a way as to provide three different component colors when combined with them at a receiver in the crosstalk free frequency region A (Figure 2).

In the receiver of Figure 4, the tinting signal $T_1$ is recovered by homodyning the composite signal with a wave of subcarrier frequency and 0° phase in a modulator 82. The tinting signal $T_2$ is recovered by homodyning the composite signal with a wave of subcarrier frequency and 90° phase in a modulator 84. The waves of subcarrier frequency are supplied to the modulators 82 and 84 by a source 86 and a phase splitter 88. The effect of the luminosity signal L on the modulator outputs is interlaced out because of the 180° phase shift of the subcarrier waves on successive scans of a given line of the raster as previously explained.

As in the transmitter of Figure 3, the output signals of the modulators must be free from the incoming composite video signals and from the locally generated signals at subcarrier frequency. In the case of the 90° phase modulator 84 that recovers the tinting signal $T_2$, this can be accomplished by inserting a high-pass filter 51 having a lower limit somewhat less than that necessary to pass the two sidebands $A'_L$ and $A'_U$ (Figure 2) in the input to the modulator 84, and a low-pass filter 53 having a response only in the cross-talk free band A (Figure 2) in the output circuit. In the case of the 0° phase modulator 82 that recovers the tinting signal $T_1$, a doubly balanced modulator of the type shown in Figure 3B may be employed. Preferably, however, the modulator 82 is singly balanced against video input signals and a low-pass filter 91 having an upper frequency limit less than $F_s$ is used to eliminate the subcarrier frequency from the output. The filter 91 may also serve to eliminate much of the dot pattern that is produced by the low frequency components of the luminosity signal L beating with the locally generated signals at subcarrier frequency in the modulator 82. If one is willing to limit the maximum frequency of $T_1$ in the two color region to ½$F_s$, a high-pass filter 85 having a lower frequency limit greater than ½$F_s$ may be inserted in front of the modulator 82 and the upper frequency limit of the low-pass filter 91 may be set at less than ½$F_s$. In this case, the modulator 82 does not require any balancing at all.

As pointed out in the discussion of the transmitter of Figure 3, careful attention must be given to equalizing the time delay of the circuits through which the signals $T_1$, $T_2$, and L must pass on their way to the reproducing mechanism. If receivers were standardized, time delays could be inserted at the transmitter to take care of unequal time delays at both the transmitter and the receiver. If receivers are not standardized, and the signals are transmitted in proper phase relationship, time delays 87 and 89 may be inserted in the luminosity and $T_1$ channels respectively so as to compensate for the delaying of the signal $T_2$ in the filters 51 and 53.

The tinting signals $T_1$ and $T_2$ and the luminosity signal L are applied to respective input terminals 26', 22' and 24' of an intercoupling network 14' that is the same as the intercoupling network 14 in the transmitter of Figure 3 illustrated in detail in Figure 3A. For the sake of simplicity, corresponding parts are indicated by primed numerals. The output terminals 25', 23' and 27' of the intercoupling network are applied to a device for reproducing green light 90, a device for reproducing red light 92 and a device for reproducing blue light 94, respectively.

The particular settings of the gain controls with their different amplitudes and polarities is determined by the type of luminosity signal that is to be transmitted and the type of two-color information that is to be available in the crosstalk frequency region. The apparatus illustrated in Figures 3 and 4 can be adapted to produce any desired result. Certain settings of the gain controls in the intercoupling amplifier 14 at the transmitter and in the intercoupling amplifier 14' of the receiver for one embodiment of the invention will be discussed below.

Turning now to Figure 5, there is shown a transmitter in which the luminosity signal L is comprised of red and green signals and the two-color information in the crosstalk band CT (Figure 2) represents the red and green components of the picture subject.

In Figure 5, the red video signals are derived from a pick-up camera 108 and supplied to an adder 110 in negative polarity by a polarity reverser 112. The adder 110 may take the form of a common resistor or it may be comprised of two amplifiers having a common plate load such as shown by any two of the tubes 29, 31 and 33 in Figure 3A, the input of one of said amplifiers being supplied with the negative red signal.

A luminosity signal L comprised of ⅔ green and ⅓ red is also supplied to the adder 110 by a black and white pickup camera 114. The luminosity signal might be derived by combining red and green signals obtained from separate pick-up cameras and adjusting their ratios by attenuators, or it may be derived by using an ordinary black and white pick-up camera and inserting between it and the light from the scene to be televised, an optical filter that passes no blue light but does pass twice as much green light as it does red light. The tinting signal $T_1$ at the output of the adder 110 is therefore equal to the luminosity signal L, which in this case is $\frac{1}{3}R+\frac{2}{3}G$ minus the red video signal R or $L-R$ and therefore can be represented by the expression $\frac{2}{3}G-\frac{2}{3}R$. This is also $2(G-L)$.

This $L-R$ tinting signal $T_1$ is applied to a filter 116 having the characteristics denoted by the graph 118 in which the video frequencies in the crosstalk free band A (Figure 2) may be passed on with half the amplitude of the video signals in the crosstalk band CT (Figure 2) to compensate for the presence of both sidebands $A'_L$ and $A'_U$ (Figure 2) for video frequencies in the crosstalk free region.

A filter having such characteristics may be built up as indicated in Figure 5A. The video frequencies in band A (Figure 2) are passed by a low-pass filter of standard design 120 via a unity gain polarity reverser 122 to an adder 124. The video frequencies in band B (Figure 2) are passed by a low-pass filter 126 to an amplifier 128 having a gain sufficient to double the amplitude of the signal. The output of the amplifier 128 is added to the output of the polarity reverser 122 in the adder 124, thus, yielding the desired characteristic 118 of Figure 5.

The output of the filter 116 of Figure 5 is applied to a modulator 130 that is similar to the modulator 62 described in connection with Figure 3. A wave of sub-carrier frequency $F_s$ is supplied by a source 132 via a phase splitter 134 to the modulator 130 and the output of the modulator 130 is applied to an adder 136.

The luminosity signal "L," which is equal to $\frac{1}{3}R+\frac{2}{3}G$ is supplied directly by the camera 114 to the adder 136. In order that phase relationships may be preserved between the read and green components in this signal and those emerging from the modulator 130, that were derived from the same red and green signals and suffered delay in the filter 116, a compensating time delay network 138 is inserted between the black and white pick-up camera 114 and the adder 136. The time delay network 138 can take the form of a delay line or any other suitable means and, in general, the delay supplied by it will be equal to the cumulative delay produced in the signals by the adder 110, the filter 116 and the modulator 130.

The blue video signals are derived from a pick-up camera 140 and after passing through the polarity reverser 142 are supplied in negative polarity to an adder 144. The luminosity signal L supplied by the pick-up tube 114 is also supplied to the adder 144, so that the tinting signal $T_2$ at the output is equal to $L-B$ and may be represented by the expression $\frac{1}{3}R+\frac{2}{3}G-B$. This video signal is passed through any well known type of low pass filter 146 having a frequency response only in the crosstalk free band A (Figure 2). It will be remembered in connection with Figure 3 that the video frequencies passed by such a low-pass filter will produce two sub-carrier sidebands and that those video signals which are prevented from reaching the output of the low-pass filter would have produced only a single sub-carrier sideband. Thus only those video frequencies of $T_2$ that produce two sub-carrier sidebands are applied to a modulator 148 which is similar to the modulator 130 discussed above.

In a preferred form of the circuit described, a wave of sub-carrier frequency $F_s$ having a relative phase of 90° is applied by the phase splitter 134 to the modulator 148. Any frequencies that might pass directly through the modulator 148 and lying in the crosstalk band CT (Figure 2), may be prevented from passing to the adder 136 from the output of the modulator 148 by a high-pass filter 149 in the manner described in connection with Fig. 3. Any sub-carrier frequency waves that might pass through the modulators 130 and 148 to the adder 136 can be cancelled out by introducing an oppositely phased amount of sub-carrier frequency waves from the phase splitter 134 to the adder 136.

The output of the adder 136 thus contains the luminosity signal, the products of modulation produced when a wave of sub-carrier frequency having 0° phase is modulated with the output of the low-pass filter 116, and the products of modulation produced when a wave of sub-carrier frequency having a 90° phase is modulated with the output of the low-pass filter 146. This composite signal is then applied to any suitable transmitter 150, or to a coaxial video line, microwave link, or the like.

In order that the receiver may be properly synchronized with the transmitter so that the locally generated waves at sub-carrier frequency at the receiver may have the proper phase relationship with respect to the received modulated waves of sub-carrier frequency derived at the transmitter from the modulators 130 and 148 respectively, a burst of sub-carrier frequency supplied by the source 132 is selected by sync circuits 152 and combined with the composite picture signal in the adder 136. Whether this synchronizing method or some other is employed is not essential to the practice of this invention, and therefore further detail with respect to these synchronizing circuits is omitted.

The composite signal formed at the transmitter of Fig. 5 can be separated into the signals representative of the component colors at a receiver, as shown in Figure 6. These signals are conveyed by the transmitter 150 of Fig. 5 and are detected in a signal detector 154 of Fig. 6 suitable for cooperation with that transmitter. The output of the signal detector 154 is applied via a suitable time-delay 156 to all of the grids 158, 160 and 162 of cathode ray tubes 164, 166, and 168. The cathode ray tubes 164, 166 and 168, respectively, are capable of reproducing red, green and blue light in accordance with the received video signals. It is to be understood that the electron beams in these tubes are scanned in synchronism by well established methods. Apparatus for accomplishing this is not shown as the details are well known to those skilled in the art. It is pointed out that the grids 158, 160 and 162 could be associated with separate electron guns in a single tri-color tube instead of in three separate color tubes.

The burst of synchronizing sub-carrier frequency is extracted from the total output of the signal detector 154 by sync circuits 170 and applied so as to control the phase of the locally generated sub-carrier frequency waves produced by the source 172. Thus, the phase and frequency of the output waves of the source 172 are properly related to the phase and frequency of those waves supplied by the source 132 in the transmitter of Figure 5. These locally generated waves are applied to a phase splitter 174 of any well known type. The locally generated wave of sub-carrier frequency at 0° phase is applied to a modulator 176 and this wave at 90° phase is applied to a modulator 178, the modulators 176 and 178 corresponding to the modulators 82 and 84 of Fig. 4.

As described in connection with Fig. 4 the output of the signal detector 154 may be applied to the modulator 176 via a high pass filter 180 shown in the dotted rectangle. The use of such a filter is optional and depends upon whether or not one wishes to recover color video signals having frequencies exceeding $\frac{1}{2}F_s$. Even if a balanced modulator is used the high pass filter 180 reduces the balance requirement.

In accordance with the homodyning principles explained above, the modulator 176 will recover the tinting signal $T_1=\frac{2}{3}G-\frac{2}{3}R$ that is applied to the modulator 130 of the transmitter of Figure 5 from the composite signal. The signal from the modulator 176 is passed through a low-pass filter 182 having an upper frequency limit corresponding to the upper frequency limit of the low-pass filter 116 at the transmitter. The filter 182 serves to eliminate sub-carrier frequencies that pass directly through the modulator 176 and also to reduce the dot pattern. The signal $T_1=(L-R)$ thus recovered is applied to the cathode 184 of the tube 164 that is adapted to produce red light. This signal is also applied to a polarity reversing attenuator 186 where it is reduced by a factor of two to give $\frac{1}{3}R-\frac{1}{3}G=(L-G)$. The output of the polarity receiver 186 is then applied to the cathode 190 of the cathode ray tube 166, that is adapted to produce green light.

The tinting signal $T_2$ is recovered from the output of the detector 154 in a manner similar to that described in connection with the modulator 84 of Fig. 4 by the modulator 178, the high pass filter 192, and the low pass filter 194. The tinting signal $T_2=(L-B)$ thus recovered is applied to the cathode 196 of the cathode ray tube 168 that is adapted to produce blue light.

The overall operation of the receiver of Figure 6 is as follows: The presence of the sub-carrier frequency $F_s$ on the grids 158, 160 and 162 of the cathode ray tubes 164, 166, and 168 is averaged to 0 by the eye as previously explained. Therefore, the only signal of importance on the grids is the luminosity signal which is in this particular case $L=\frac{1}{3}R+\frac{2}{3}G$. The signal has been suitably delayed in the time-delay 156 so as to compensate for the time delay of the signals appearing on the cathodes of the cathode ray tubes, the delaying of the latter signals being caused by filters 180, 182, 192 and 194.

The signal applied to the cathode 184 of the cathode ray tube 164 is $L-R$ and owing to the fact that it is on the cathode, it is subtracted from a signal L which appears on the grid 158 yielding a net signal of R. Thus, the only color in the cathode ray tube 164 affecting the intensity variations of the beam is red, as represented by the original red signal derived at the pick-up camera 108 of the transmitter of Figure 5.

In a similar way, when the signal $L-G$ that is applied to the cathode 190 of the green reproducing cathode ray tube 166 is subtracted from the luminosity signal L on the grid 160 it yields a pure green signal. There was no separate pick-up camera for green light in the transmitter of Figure 5 but green information was included in the output of the black and white pick-up camera 114.

The $L-B$ signal applied to the cathode 196 of the blue reproducing tube 168, when subtracted from the luminosity signal applied to the grid 162 of this tube, yields a pure blue signal. A low-pass filter 199 having a response only to video frequencies in band A (Figure 2) shown in dotted rectangle, may be inserted if desired between the output of the delay circuit 156 and the grid 162 of this tube in order to insure that the higher frequency components of the luminosity signal are not applied to the grid 162. If, for example, there were higher frequency components in red and green, they could not be cancelled out by the blue signal as the blue signal has been limited in frequency by the low-pass filter 194. The filter 199 also cuts out the blue tube from contributing to the high frequencies of a black and white image. The filter 199 may not be necessary in view of the fact that the eye's acuity for detail in blue is extremely low.

For the low-frequency video information lying within band A as shown in Figure 2, the component colors red, green and blue are separately reproduced as just described in accurate accord with the composition of the light picked up from the original picture. However, any blue video information lying above this frequency band is eliminated from the subcarrier channel by the low-pass filter 146 (Figure 5). Other signals above this frequency band that are produced at the receiver by the action of the modulator 178 on the $T_2$ and L signals and other undesired signals are prevented from reaching the cathode 196 by the combination of the filters 192 and 194. Therefore, the only cathode ray tubes receiving video signals in the crosstalk frequency band CT (Figure 2) are the red and green reproducing tubes 164 and 166. It will be noted that all of this red and green information is recovered by the modulator 176.

In this crosstalk video frequency range only a single sideband of the subcarrier is available and since this represents a loss of energy, the frequencies that are represented by a single sideband were increased in amplitude before being applied to the modulator 130 in the transmitter of Figure 5. This maintains the proper relative intensity between the recovered video signals having frequencies in the crosstalk band CT and the video signals having frequencies in the crosstalk free band A (Figure 2).

One of the results obtained from the use of this invention is the elimination of brightness flicker which would otherwise result from the effect of the luminosity signal "L" in the receiver modulators.

It has previously been stated that the 180° phase change in the subcarrier frequency on successive scans of a given line causes the effects of the luminosity signal in the tinting channels to add on one scan and subtract on a succeeding scan, the average of these effects being zero. If the eye is capable of integrating the light energy produced at the receiver on two successive scans, the effects of the luminosity signal are not harmful, but the eye's ability to perform this integration decreases as the areas involved get larger. The modulator at the receiver produces a frequency equal to $F_s$ plus the frequency of the luminosity signal and a frequency signal equal to their difference. Therefore, if the luminosity signal "L" contains frequencies near $F_s$, the difference frequency is low and represents large areas that may not be well integrated by the eye.

Inasmuch as portions of the luminosity signal "L" are unavoidably applied to each of the receiver modulators, the effect on the individual reproducers of these low difference frequencies is a flicker in overall intensity or brightness. However, in the receiver of Figure 6, the output of the modulator 176 that is applied to the cathode 190 of the green reproducer tube 166 is opposite in polarity and has half the value of the output of this same modulator that is applied to the cathode 184 of the red reproducing tube 164.

Because the eye is roughly twice as sensitive to green light as it is to red, any increase in green light is seen as being equal to the decrease of the red and vice versa. Therefore, the apparent change in brightness due to the luminosity signal is substantially zero in the system of Figures 5 and 6. A yellow subject area having fine brightness detail is reproduced alternately as reddish on one scan and greenish on the next. On all scans its apparent brightness remains the same. The residual interlace flicker thus becomes a hue flicker only. In this system, cancellation of brightness flicker takes place for red and green channels and because of the low intrinsic brightness, the blue flicker that remains is relatively harmless.

The transmitter of Figure 3 will produce just the same composite signal as does the transmitter of Figure 5 if cameras 8, 10 and 12 of the former are made sensitive to the single component colors red, green, and blue respectively, and the gain controls of intercoupling network 14 are set to give the coupling coefficients shown in Figure 7A. If the cameras of Figure 3 are sensitive, respectively, to red, luminosity ($\frac{1}{3}R+\frac{2}{3}G$), and blue, the gain-control settings necessary to duplicate the composite signal given by Figure 5 are those shown in Figure 8A.

This composite signal produced by the apparatus of Figure 5 includes (1) a luminosity signal $L=\frac{1}{3}R+\frac{2}{3}G$; (2) a wide band tinting signal $T_1=L-R=\frac{2}{3}G-\frac{2}{3}R$; and (3) a narrow band tinting signal $$T_2=L-B=\frac{1}{3}R+\frac{2}{3}G-B$$

The receiver of Figure 6 operates in response to this composite signal as described. Also, when the transmitter of Figure 3 is operated under the conditions of Figure 7A to produce this composite signal as described, the receiver of Figure 4, when the network 14' is operated under the conditions of Figure 7B, will produce the same result as that described for the receiver of Figure 6. The operation of the transmitter of Figure 3 under the conditions of Figure 8A and the receiver of Figure 4 under the conditions of Figure 8B also will produce the same result. As would be expected from the fact that the composite signal is the same when the transmitter of Figure 3 is operated under the different conditions of Figures 7A and 8A, the operating conditions indicated in Figures 7B and 8B for the receiver of Figure 4 are identical. It will be noted that a number of the gain controls are set to give zero coupling particularly in the case of Figures 8A and 8B. Figures 5 and 6 differ from the more general Figures 3 and 4 by omission of the circuits corresponding to controls set at zero, and as a result exhibit a highly desirable simplicity, in payment for which they have given up the flexibility of the general form.

Dotted connections in Figures 7 and 8 represent the modulators, filters, and transmission medium of Figures 3 and 4 in applying the signals derived from network 14 at the transmitter to network 14' at the receiver.

Figure 9 illustrates another form of transmitter for accomplishing essentially the same result as that of the transmitter in Figure 5 and in which the modulated subcarrier signals are mixed rather than the camera outputs. Here again, the luminosity signal and the two-color information in the crosstalk range represent combinations of green and red color information. In the arrangement of Figure 9, the modulators 130 and 148 of Figure 5 each take the form of two simple modulators, which are respectively 208, 216 and 210, 222, operated with subcarriers 180° out of phase with each other. This effects a carrier balance as well as permitting the signal combining elements 110, 112, 142, and 144 (Figure 5) to be omitted.

The luminosity signal provided by a pick-up camera 200, that is similar to the pick-up camera 114 of Figure 5, is comprised of ⅔ green and ⅓ red. This signal is by-passed to an adder 204, through a time delay 202, corresponding to the time-delay 138 in the transmitter of Figure 5 and compensating for delays in filters 206, 207, 211, 214, 220, and 223. After passing through a filter 206 that corresponds to the filter 116 of Figure 5, the luminosity signal is also applied to a modulator 208 operating at 0° phase. The luminosity signal L is also applied to a modulator 210 operating at 90° phase via a low pass filter 207 having a response only in band A (Figure 2) and corresponding to filter 146 of Figure 5. The output of the modulator 210 is also applied to the adder 204 via a high pass filter 211 corresponding to the filter 149 of Figure 5 and having a lower frequency limit equal to the cut-off frequency of the filter 206 which corresponds to the filter 116 of the transmitter of Figure 5.

Red video signals are picked up by a standard pick-up camera 212 and after passing through a filter 214, similar to the filter 206 and also to the filter 116 of Figure 5, they are applied to a modulator 216 operating at 180° phase. The output of the modulator 216 is applied to the adder 204.

The modulators 208 and 216 should be balanced against the modulating signal or this signal should be prevented from passing through the modulators by use of low pass and high pass filters in a manner described in connection with the modulator 66 of Figure 3.

The blue video signals are picked up by a suitable pick-up camera 218 and applied through a low-pass filter 220 having a response only in band A (Figure 2) and corresponding to filter 146 of Figure 5, and to a modulator 222 operating at 270° phase. The output of the modulator 222 is also applied to the adder 204 via a high-pass filter 223 that is the same as the filter 211. The adder 204 may take the form of five electron tubes sharing a common plate load, the inputs of four of the tubes being connected each to a different one of the modulators and the fifth tube having its input connected to the time-delay circuit 202.

Sinusoidal voltage waves of sub-carrier frequency are supplied by a source 224 to a phase splitter 226 of standard design that is adapted to supply a 0° phase of waves of sub-carrier frequency to the modulator 208, a 90° phase to the modulator 210, 180° phase to the modulator 216, and a 270° phase to the modulator 222.

The operation of this transmitter is as follows: Inasmuch as the luminosity signal is applied to the 0° phase modulator 208, the red video signal that is applied to the 180° phase modulator 216 is effectively subtracted from it in the adder 204, thus giving the equivalent of a sub-carrier wave modulated by the $L-R$ signal, which was termed the tinting signal $T_1$ in the discussion of the transmitter of Figure 5. The low frequencies of the luminosity signal L are applied to the 90° phase modulator 210 and inasmuch as the blue signal is applied to the 270° phase modulator 222, the resultant of the outputs of these two modulators obtained in the adder 204 is the equivalent of a sub-carrier wave modulated by $L-B$ corresponding to the tinting signal previously termed $T_2$. Of course, the luminosity signal L itself comes through the time-delay network 202. Therefore, the output of the adder 204 contains the signals L, the equivalent of a sub-carrier wave modulated by $L-R$ and the equivalent of a sub-carrier wave modulated by $L-B$ that were supplied by the adder 136 in Figure 5.

Figures 10 and 11 illustrate an apparatus that produces results similar to those obtained from Figures 5 and 6, but with the further refinements that the luminosity channel includes some response to blue subject matter, and that minimization of brightness flicker is extended to include the blue tube. The red video signals are supplied by a pick-up camera 280 (Figure 10) through a polarity reverser 282 to an adder 284. The adder 284 is also supplied with a luminosity signal having the composition $$(\tfrac{8}{17}R+\tfrac{16}{17}G+\tfrac{1}{17}B)\tfrac{17}{25}$$

derived from a luminosity pick-up camera 286 via an attenuator 288 that reduces the signals applied to it by a factor of $\frac{17}{25}$. This addition of the attenuated luminosity signal and the negative red signal results in a tinting signal $T_1$ at the output of the adder 284 represented by the expression $$\tfrac{16}{25}G+\tfrac{1}{25}B-\tfrac{17}{25}R$$

This signal is passed through a filter 290 corresponding to the filter 116 of Figure 5 and which may be of the type shown in Figure 5A and is then applied to a 0° phase modulator 292.

The blue video signals are derived from a blue pick-up camera 294 and, after being inverted in polarity in the polarity reverser 296, they are applied to an adder 298. The luminosity signal supplied by the pick-up camera 286 is also supplied to the adder 298. In this particular embodiment, the negative red video signal at the output of the polarity reverser 282 is attenuated by a factor of $\frac{8}{17}$ in the attenuator 300 and applied to the adder 298 so as to cancel out the red signal included in the luminosity signal that was also supplied to the adder 298 from the pick-up camera 286. The resultant signal at the output of the adder 298 is a tinting signal $T_2$ represented by $\frac{16}{17}G-\frac{10}{17}B$ and as shown in previous embodiments of this invention, the video signal frequency is limited to band A (Figure 2) by a low-pass filter 302 before being applied to a 90° phase modulator 304.

A source of subcarrier frequency is indicated by the numeral 306 and it is split into 0° and 90° phases by the phase splitter 308. The outputs of the 0° phase modulator 292 bearing the tinting signal $T_1$ and the 90° phase modulator 304 bearing the tinting signal $T_2$ are combined with the luminosity signal in an adder 310. The luminosity signal, reduced by a factor of $\frac{17}{25}$ in attenuator 288, is suitably delayed in a time-delay network 312 in order to compensate for the time delay of the tinting signals coming through the modulators 292 and 304 and the filters 290 and 302. The output of the adder 310 is applied to any suitable transmitter 314.

Figure 11 illustrates a type of receiver adapted to reproduce colored images from the signals transmitted by the transmitter of Figure 10. The composite signal fed to the transmitter 314 of Fig. 10 is recovered by the detector 316 and applied to the grids 318, 320 and 322 of cathode ray tubes 324, 326 and 328 that are adapted to respectively reproduce red, green and blue light in accordance with the video signals. As previously stated, the presence of the sub-carrier on these grids has no average effect on overall brightness as it interlaces out.

The tinting signals $T_1$ and $-T_1$ are derived from a 0° phase balanced modulator 332 and a 180° phase balanced modulator 334, respectively. The signal $T_1$ is recovered by the homodyning action of the 0° phase modulator 332 and supplied via a low-pass filter 336 having a cut-off corresponding to that of the filter 290 of Figure 10, to the cathode 338 of the cathode ray tube 324. The negative of this signal, that is $-T_1$, is recovered by the 180° phase modulator 334 and is supplied to an adder 340 via a low-pass filter 342, having an upper frequency limit the same as that of filter 336, and an attenuator 344 that reduces the amplitude of the signals supplied to it by a factor of $\frac{8}{17}$.

The sidebands $A'_L$ and $A'_u$ (Figure 2) of the subcarrier frequency of $F_s$ representing the tinting signal $T_2$ are limited in frequency by a high-pass filter 348 having a lower frequency limit only low enough to pass the two sidebands and which is coupled to the output of the detector 316. The output of the high-pass filter 348 is applied to a 270° phase modulator 350 and to a 90° phase modulator 352. The filter 348 prevents any video frequency signal in band CT (Figure 2) from entering modulators 350 and 352. The homodyning action of the 270° phase modulator 350 produces a signal $-T_2$, which after being filtered in the low-pass filter 354 having a response only in band A (Figure 2) is reduced in amplitude in an attenuator 356 by a factor of $\frac{1}{16}$. The output of the attenuator 356 is coupled to the adder 340. The output of the adder 340 is coupled to the cathode 346 in the cathode ray tube 326.

The tinting signal $+T_2$ is recovered by the homodyning action of the 90° phase modulator 352, and after being limited in frequency to band A (Figure 2) in the low-pass filter 358, it is supplied to an adder 360. The adder 360 also receives the reduced $-T_1$ signal appearing at the output of the attenuator 344. These combined signals are coupled to the cathode 362 of the cathode ray tube 328.

An oscillator 315 of subcarrier frequency is synchronized by sync circuits of a known type 317 and its output is split into 0°, 90°, 180° and 270° quadrature phase components by a phase splitter 319. These components are impressed upon the modulators 332, 352, 334 and 350 respectively, as described.

The following calculations indicate the operation of the receiver shown in Figure 11. The fact that these illustrative calculations are made with reference to only this embodiment of the invention should not be construed as an intention to restrict the invention to any one particular form such as the one shown in Figure 11. Those signals appearing on the cathodes of the cathode ray tubes in this figure will be related to the grid for these calculations and therefore are multiplied by −1 and added to the signals appearing on the grids in the figure. For convenience, separate analyses will be made for the signals in the different frequency bands A, B and CT of Figure 2. Within each of these bands, the signals controlling the three cathode ray tubes 324, 326 and 328 will be separately calculated. In each case, the resultant signal is produced by combining the luminosity signal L with one or both of the tinting signals $T_1$ and $T_2$. The red cathode ray tube 324 receives signals representing the red color component of the object throughout the entire band B (Figure 2). Hence, only one calculation is made for this tube for all frequencies in this band. No calculations are made for the green and blue cathode ray tubes 326 and 328 for all frequencies in this band because these tubes do not receive signals representing respectively the green and blue color components of the object for all frequencies in this band. In the crosstalk band CT (Figure 2), the green and blue tubes receive the same signals. These signals represent a mixture of the blue and green color components of the object. Hence, only one calculation is made for these two tubes for such signal frequencies. In making the calculations referred to up to this point, it will be noted that only the luminosity signal L and the wide band tinting signal $T_1$ are used. In the low frequency band A (Figure 2), the green and blue tubes receive different signals in addition to those received in the crosstalk region CT (Figure 2). Hence, these additional signals are separately calculated for the green and blue tubes. In calculating the additional signals for the green and blue tubes in the low frequency band A (Figure 2), the narrow band tinting signal $T_2$ is added to the signals calculated for these tubes in the crosstalk band CT (Figure 2). When these signal additions are made, it will be seen that the green and blue tubes receive signals respectively representing the green and blue color components of the object.

*Analysis for video signal frequences in band B (Figure 2)*

$$\frac{8}{25}R+\frac{16}{25}G+\frac{1}{25}B=L$$

(L is the luminosity signal applied to the grid 318 of the red tube 324)

plus $$\frac{17}{25}R-\frac{16}{25}G-\frac{1}{25}B=-T_1$$

($-T_1$ is the tinting signal that is applied to the cathode of the red tube as it would appear if applied to the grid 318)

equals $$R+O+O=L-T_1$$

(R is the resultant signal controlling the intensity of the beam in the red tube for all video frequencies in band B Figure 2).

*Analysis for video signal frequencies in band CT (Figure 2)*

$$\frac{8}{25}R+\frac{16}{25}G+\frac{1}{25}B=L$$

(L is the luminosity signal also applied to the grid 320 of the green tube 326 and also to the grid 322 of the blue tube 328)

plus $$-\frac{8}{25}R+\frac{8\times 16}{17\times 25}G+\frac{8}{17\times 25}B=\frac{8}{17}T_1$$

($\frac{8}{17}T_1$ is the tinting signal applied to the cathodes of the blue and green tubes as related to the grids)

equals $$0+\frac{16}{25}\left(1+\frac{8}{17}\right)G+\frac{1}{25}\left(1+\frac{8}{17}\right)B=L+\frac{8}{17}T_1=\frac{16}{17}G+\frac{1}{17}B$$

($\frac{16}{17}G+\frac{1}{17}B$ is the net signal effectively on the grids 320 and 322 of the green and blue tubes respectively for crosstalk frequencies in band CT Figure 2).

The cathode 346 of the green tube 326 and the cathode 362 of the blue tube 328 receive in this frequency range no signals from the tinting signal $-T_2$ and $+T_2$ derived by the modulators 350 and 352 respectively owing to the filtering action at the transmitter and receiver. Thus the crosstalk band of video frequencies are represented by two colors, red and blue-green.

*Analysis for video signal frequencies in Band A (Figure 2)*

$$\frac{16}{17}G+\frac{1}{17}B=L+\frac{8}{17}T_1$$

($L+\frac{8}{17}T_1$ is the signal that effectively appears at the green tube grid 320 for frequencies of $T_1$ and L in band A Figure 2)

plus $$\frac{1}{17}G-\frac{1}{17}B=\frac{1}{16}T_2$$

($\frac{1}{16}T_2$ is the tinting signal derived from the modulator 350 for frequencies in band A (Figure 2) only as related to the grid)

equals $$G=L+\frac{8}{17}T_1+\frac{1}{16}T_2$$

(G is the resultant signal on the green tube and indicates that the green signal alone controls the green tube for frequencies in band A Figure 2).

$$\frac{16}{17}G+\frac{1}{17}B=L+\frac{8}{17}T_1$$

($L+\frac{8}{17}T_1$ is the signal that is applied to the blue tube grid for frequencies of $T_1$ and L in band A (Figure 2), the same as that applied to the green tube grid)

plus $$-\frac{16}{17}G+\frac{16}{17}B=-T_2$$

($-T_2$ is the contribution of the tinting signal $T_2$ to the signal frequencies in band A (Figure 2) as supplied by the modulator 352)

equals $$B=L+\frac{8}{17}T_1-T_2$$

(B is the resulant signal on the blue tube and indicates that the blue signal alone controls the blue tube for frequencies in band A Figure 2).

The flexible system of Figures 3 and 4 if adjusted as indicated in Figure 12 will duplicate the performance of Figures 10 and 11 where camera 8 is sensitive to red, camera 12 is sensitive to blue, and camera 10 is sensitive to luminosity ($\frac{8}{17}R+\frac{16}{17}G+\frac{1}{17}B$).

The versatility of the transmitter and receiver of Figures 3 and 4 is such that if their intercoupling networks 14 and 14' are adjusted as indicated in Figure 13, the transmitted signal is exactly that produced by a symmetrical three phase subcarrier system with a by-passed channel except for the removal of cross talk components by the filter 64 (Figure 3). The output of the intercoupling network 14' is then a duplicate of the output of the symmetrical three phase system except that cross talk in the crosstalk region is absent.

Having thus described the invention what is claimed is:

1. A color television transmitter comprising in combination an intercoupling network having three input terminals and three output terminals, gain control devices connected between each input terminal and each output terminal, a first modulator coupled to a first output terminal, a second modulator connected to a second output terminal, a source of subcarrier frequency, a phase splitter coupled to said source, said phase splitter having two differently phased outputs that are substantially in phase quadrature, one of said outputs being coupled to said first modulator, the other output being coupled to said second modulator, and an adder coupled to the third terminal of said intercoupling network and to the outputs of each of said modulators.

2. A color television transmitter as described in claim 1 including a filter passing frequencies below a first given frequency connected serially with said first output terminal and said first modulator, and another filter passing frequencies below a second given frequency lower than said first given frequency connected serially with said second output terminal and said second modulator.

3. In a color television transmitter, the combination of a source of video signals representative of luminosity, a source of signals representing a first color, a first means for combining the outputs of said sources, means for providing a first alternating current wave, a modulator having two inputs and an output, means for coupling one input of said modulator to the output of said combining means, and means for coupling the other input of said modulator to said means for providing said first alternating current wave, a source of signals representative of a second color, a filter connected to the output of said latter source, said filter being adapted to pass only the low frequency of said second color signal, a second means for combining the output of said filter and the output of a luminosity signal appearing at the output of first mentioned source, means for providing alternating current waves that are in phase quadrature with the first mentioned alternating current waves, a second modulator having two inputs and an output, means for coupling one of the inputs of said second modulator to the output of the second combining means, means for coupling the other input of the modulator to the means for providing the alternating current waves that are in quadrature with the first alternating current wave, an adder having two inputs and an output, means for coupling one of the inputs of said adder to the output of the first modulator and means for coupling the other input of said adder to the output of said second modulator.

4. A color television transmitter comprising in combination a first pickup camera adapted to provide signals representative of the intensity variations of color, a second pickup camera adapted to provide signals representative of luminosity, a first adder coupled so as to receive said luminosity signals, a polarity reverser coupled between said first pickup camera and said adder, a filter adapted to transmit low video frequencies with one-half the relative amplitude of high video frequencies, said filter connected to the output of said first adder, a first balanced modulator coupled to the output of said filter, a third pickup camera adapted to derive video signals representative of the intensity variations of a different color, a second adder, said adder being coupled to the output of said second pickup camera, a polarity reverser coupled between said third pickup tube and said second adder, a second filter coupled to the output of said second adder, said latter filter being adapted to pass only the low video frequencies, a second balanced modulator coupled to the output of said second filter, a source of subcarrier frequency, a phase splitter coupled to the output of said source, means for coupling differently phased outputs of said phase splitter to said first and second balanced modulators, and a third adder coupled to the output of said second pickup tube and to the outputs of said first and second balanced modulators.

5. A color television transmitter comprising in combination a pickup camera adapted to provide video signals that are representative of the intensity variations of a first color, a first adder, a polarity reverser connected between said first pickup camera and said adder, a second pickup camera adapted to provide video signals representing the luminosity, a first attenuator connected between the output of said second pickup tube and said first adder, a filter connected to the output of said first adder, said filter having such characteristic that low frequencies are passed through it at half the amplitude of high video frequencies, a first balanced modulator, means for coupling the output of said filter to said first balanced modulator, a third pickup camera adapted to provide video signals representative of the intensity variations of a second color, a polarity reverser coupled between said third pickup camera and said second adder, the output of said second pickup camera being coupled to an input of said second adder, a second attenuator connected between the output of said first polarity reverser and the input of said second adder, a filter coupled to the output of said second adder, said filter being adapted to pass only the low video frequencies, a second balanced modulator means for coupling an input of said second modulator to the output of said second mentioned filter, a third adder having a plurality of inputs, means for coupling a first input of said adder to the output of said first modulator, means for coupling a second input of said adder to the output of said second modulator and means for coupling a third input of said adder to the output of said first attenuator, a source of subcarrier frequency, and a phase splitter connected to the output of said source, said phase splitter having a plurality of outputs and being adapted to provide at one of these outputs a wave of a predetermined phase of the subcarrier frequency and at the other of these outputs a wave of subcarrier frequency that is in phase quadrature with the wave of subcarrier frequency appearing at the other output, means for coupling one of the outputs of said phase splitter to said first modulator and means for coupling the other output of said phase splitter to said second modulator.

6. A color television receiver comprising in combination a detector, a first balanced modulator having an input and an output, said input being coupled to the output of said detector, a second balanced modulator having an input and an output, said input being coupled to the output of said detector, a local source of subcarrier frequency, a phase splitter coupled to the output of said source, one output of said phase splitter being applied to said first balanced modulator, the second output being applied to said second balanced modulator, a low-pass filter adapted to pass low and high video frequencies coupled to the output of said first balanced modulator, a filter adapted to pass only the low video frequencies coupled to the output of said second balanced modulator and intercoupling network having three input terminals and three output terminals, one of said input terminals being coupled to the output of said detector, a second input terminal being coupled to the output of said low-pass filter, and a third input terminal being coupled to the output of said second low-pass filter, and gain controls connected between each input terminal and each output terminal.

7. A color television receiver comprising in combination a signal detector, a 0° modulator, and a 180° modulator, the input of said modulators being coupled to the output of said detector, means for subtracting the output of said 0° modulator from the output of said signal detector, an attenuator connected to the output of said 180° modulator, an adder connected to the output of said attenuator, means for subtracting the output of said adder from the output of said signal detector, a 270° modulator and a 90° modulator coupled to the output of said signal detector, a low-pass filter connected to the output of said 270° modulator so as to pass only low video frequencies, an attenuator connected to the output of said low-pass filter, the output of said attenuator being connected to said adder, a second low-pass filter connected to the output of said 90° modulator, said low-pass filter being adapted to pass only the low video frequencies, a second adder having one input connected to the output of said second latter low-pass filter and the other input connected to the output of said first attenuator, and means adapted to subtract the output of said second adder from the output of said signal detector.

8. In a color television system in which the transmitted composite signal is comprised of a luminosity signal and a subcarrier that is the resultant of the modulation of first and second subcarrier waves with tinting signals of different spectrum width, said waves being in phase quadrature, a color television receiver comprising means for deriving said first tinting signal, means for deriving said second tinting signal, means for subtracting at least a portion of said first tinting signal from said luminosity signal, means for adding at least a portion of said second tinting signal to said luminosity signal, and means for subtracting said second tinting signal from said luminosity signal.

9. A color television system comprising in combination, a source of signals representing luminosity, a source of signals representing a first tinting signal, a source of signals representing a second tinting signal, means for modulating a first wave of subcarrier frequency with said first tinting signal, means for modulating a second wave of subcarrier frequency that is in phase quadrature with said first wave of subcarrier frequency with said second tinting signal, each of said modulating means being such that each modulator may provide waves of subcarrier frequency of either positive or negative relative polarities, an adder to which the luminosity signal and the outputs of said modulators are applied so as to form a composite signal, a receiver adapted to detect said composite signal, means for deriving said first tinting signal, means for deriving said second tinting signal, means for subtracting said first tinting signal from said composite signal, means for adding said second tinting signal to said composite signal, and means for subtracting said second tinting signal from said composite signal.

10. A transmitter comprising in combination a source of luminosity signals having a given spectrum, a source of a first tinting signal and a source of a second tinting signal, means for providing a first wave of subcarrier frequency, means for providing a second wave of subcarrier frequency that is in phase quadrature with the first wave of subcarrier frequency, the subcarrier frequency lying within the spectrum of the luminosity signals, a first modulator having two inputs and an output, means for coupling one of the inputs of said first modulator to the means for providing the first wave of subcarrier frequency, means for coupling the other input of said first modulator to the source of the first tinting signal, a second modulator having two inputs and an output, means for coupling one of the inputs of the second modulator to the means for providing the second wave of subcarrier frequency that is in phase quadrature with the first, means for coupling the other input of the second modulator to the source of the second tinting signal, an adder having three inputs and an output, means for coupling one of the inputs of the adder to the source of luminosity signals, means for coupling a second input of the adder to the output of the first modulator, and means for coupling the third input of the adder to the output of the second modulator so that a composite signal appears at the output of the adder, said means for coupling said second modulator to said source of said second tinting signal including means for limiting said tinting signals to frequencies lower than Fco—Fs.

11. A transmitter as described in claim 10 wherein said means coupling said first modulator to said source of said first tinting signal includes means for applying frequencies lower than Fco—Fs to said first modulator at one half the amplitude of the signals immediately above this frequency.

12. In a color television transmission system for conveying chromaticity information by means of a color subcarrier wave and luminosity information by means of a main carrier wave, the combination of, a source of waves of subcarrier frequency, modulating means coupled to said source of subcarrier waves for modulating said subcarrier wave in accordance with three component colors for signal frequencies up to a given frequency, means coupled to said source of subcarrier waves for modulating said subcarrier wave with two color information for signal frequencies in excess of said given frequency, means generating a luminosity signal, a signal adder, means coupling said first modulating means to said signal adder, means coupling said second modulating means to said signal adder, and means coupling said luminosity signal source to said signal adder, whereby a composite color television signal is provided having a luminosity signal component and a color subcarrier wave component adapted to provide three color reproduction for signal frequencies below said given frequency and two color reproduction for signal frequencies in excess of said given frequency.

13. In a color television transmission system for conveying chromaticity information by means of a color subcarrier wave having two quadrature phased components and luminosity information by means of a main carrier wave, the combination of, a source of red color signals, a source of blue color signals, a source of green color signals, a first signal adding means coupled to said red, said blue, and said green color signal sources for providing a luminosity signal, a second signal adding means coupled to said red, said blue and said green color signal sources for providing a first tinting signal which when taken in combination with said luminosity signal provides two color information, a third signal adding means coupled to said red, said blue, and said green color signal sources for providing a second tinting signal which when taken in combination with said luminosity signal and said second tinting signal provides three color information within a color triangle the apices of which are the component colors represented by said red, said blue, and said green color signals, a source of waves of a given phase and of subcarrier frequency, a first modulating means coupled between said second signal adding means and said source of subcarrier waves to provide a subcarrier wave of a given phase amplitude modulated in accordance with said first tinting signal, a source of quadrature phased subcarrier waves, a second modulating means coupled between said third signal adding means and said quadrature phased subcarrier wave source for providing a quadrature phased subcarrier wave amplitude modulated in accordance with said second tinting signal, a fourth signal adding means, means coupling said first signal modulator to said fourth signal adding means, means coupling said second signal adding means to said fourth adding means, means coupling said first signal adding means to said fourth adding means whereby a composite signal is provided comprising a phase and amplitude modulated subcarrier wave and a luminosity signal.

14. In a color television transmission system for conveying chromaticity information by means of a color subcarrier wave and lumniosity information by means of a main carrier wave, means generating a composite signal comprising a luminosity signal and a phase and amplitude modulated subcarrier wave including the combination of, a source of red color signals, a source of blue color signals, a source of green color signals, a first signal combining means coupled to said red, said blue, and said green color signal sources for providing a luminosity signal, a second signal combining means coupled to said red, said blue, and said green color signal sources for providing a first tinting signal representing two color information when taken in combination with said luminosity signal, a first frequency limiting means coupled to said second signal combining means for passing frequencies up to a first given frequency only, a third signal combining means coupled to said red, said blue, and said green color signal sources for providing a second tinting signal containing information which when taken in combination with said luminosity signal and said first color signal provides three color information within a color triangle the apices of which are the component colors represented by the red, the blue, and the green color signals, a second frequency limiting means coupled to said thrid signal combining means for passing frequencies up to and including a second given frequency lower than said first given frequency, a first modulator coupled to said first frequency limiting means, a source of subcarrier waves coupled to said first modulator, a second modulator coupled to said second frequency limiting means, a source of quadrature phased subcarrier waves coupled to said second modulator, a fourth signal combining means, means coupling said first modulator to said fourth signal combining means, means coupling said second modulator to said fourth signal combining means, means coupling said first signal combining means to said fourth signal combining means whereby a composite signal comprising a phase and amplitude modulated subcarrier wave and a luminosity signal is provided.

15. In a color television receiver adapted to receive composite color television signals including a luminosity signal and a color subcarrier wave having two quadrature phased components, each of which represents a tinting signal, the combination of, means deriving a first tinting signal from said composite color television signal, means deriving said luminosity signal from said composite color television signal, means combining said first tinting signal with said luminosity signal to provide reproduction of an image in two colors, means deriving a second tinting signal from said composite television signal, and means combining said second tinting signal with said first tinting signal and said luminosity signal to provide reproduction of an image in three colors.

16. In a color television receiver adapted to receive color television signals including a luminosity signal and a color subcarrier wave having two quadrature phased components, one of which represents a first tinting signal which when taken in combination with said luminosity signal includes color information suitable for reproducing an image in two colors and the other of which represents a second tinting signal which when taken in combination with said first tinting signal and said luminosity signal includes color information suitable for reproducing an image in three colors, the combination of, means deriving said first tinting signal from said color subcarrier wave, means deriving said second tinting signal from said color subcarrier wave, means combining said first tinting signal, said second tinting signal, and said luminosity signal to provide a first component color signal, means combining said first tinting signal, said second tinting signal, and said luminosity signal to provide a second component color signal, and means combining said first tinting signal, said second tinting signal, and said luminosity signal to provide a third component color signal.

17. In a color television receiver adapted to receive color television signals including, a luminosity signal component and a color subcarrier wave which is modulated with information representing three component colors for signal frequencies from zero up to a given frequency and which is modulated in accordance with two color information for frequencies in excess of said given frequency, the combination of, means separating said color subcarrier wave from said luminosity signal, means deriving color information from said subcarrier wave which when taken in combination with said luminosity signal provides three color reproduction in three component colors for signal components having frequencies from zero up to said given frequency, and means deriving color information from said color subcarrier wave which when taken in combination with said luminosity signal provides two color reproduction in two selected colors for signal components having frequencies in excess of said given frequency.

18. In a color television receiver adapted to receive a composite color television signal including a luminosity signal and a color subcarrier wave having two quadrature phased components, a first one of said quadrature phased components being modulated with a first tinting signal having frequencies within a first band up to a first frequency and including selected relative amplitudes and polarities of three signals representative of red, green and blue component colors of an object, the second one of said quadrature phased components being modulated with a second tinting signal having frequencies within a second band up to a second frequency higher than said first frequency and including selected relative amplitudes and polarities of said three signals representative of red, green and blue component colors of the object, said second tinting signal representing a gamut of colors of said object ranging from a combination of the red and green component colors to a combination of the blue and green component colors, the combination including: means responsive to said composite color television signal and operating in phase with said first quadrature phased component for deriving said first tinting signal from said color subcarrier wave; means responsive to said composite color television signal and operating in phase with said second quadrature phased component for deriving said second tinting signal from said color subcarrier wave; means for utilizing said luminosity signal portion of said composite color television signal; and means for combining selected relative amplitudes and polarities of said luminosity signal portion and said derived tinting signals to produce individual signals respectively representative of the component colors of said object.

19. In a color television receiver adapted to receive a composite color television signal including a luminosity signal and a color subcarrier wave having two quadrature phased components, said luminosity signal representing the apparent brightness of an object and including selected relative amplitudes of a plurality of signals representative of red, green and blue component colors of the object, a first one of said quadrature phased components being modulated with a first tinting signal having frequencies in a first band up to a first frequency and including selected relative amplitudes and polarities of said red, green and blue component color representative signals, said first tinting signal representing a gamut of colors of said object ranging from a red-blue combination of said component colors to a first red-green combination of said component colors, and the second one of said quadrature phased components being modulated with a second tinting signal having frequencies in a second band up to a second frequency higher than said first frequency and including selected relative amplitudes and polarities of said red, green and blue component color representative signals, said second tinting signal representing a gamut of colors of said object ranging from a second red-green combination of said component colors to a green-blue combination of said component colors, the combination including: means responsive to said composite color television signal and operating in phase with said first quadrature phased component for deriving said first tinting signal from said color subcarrier wave; means responsive to said composite color television signal and operating in phase with said second quadrature phase component for deriving said second tinting signal from said color subcarrier wave; means for utilizing said luminosity signal portion of said composite color television signal; signal combining means operative in said first frequency band for combining selected relative amplitudes and polarities of said luminosity and first and second tinting signals to produce signals representative of said red, green and blue component colors of the object; and said signal combining means also being operative in said second frequency band for combining selected relative amplitudes and polarities of said luminosity and second tinting signals to produce signals representative of said second red-green and said green-blue combinations of the component colors of the object.

20. In a color television receiver adapted to receive a composite color television signal including a luminosity signal and a color subcarrier wave having two quadrature phased components, said luminosity signal representing the apparent brightness of an object and including selected relative amplitudes of a plurality of signals representative of red, green and blue component colors of the object, a first one of said quadrature phased components being modulated with a first tinting signal including selected relative amplitudes and polarities of said red, green and blue component color representative signals, said first tinting signal representing a gamut of colors of said object ranging from a red-blue combination of said component colors to a first red-green combination of said component colors, and the second one of said quadrature phased components being modulated with a second tinting signal including selected relative amplitudes and polarities of said red, green and blue component color representative signals, said second tinting signal representing a gamut of colors of said object ranging from a second red-green combination of said component colors to a green-blue combination of said component colors, the combination including: means responsive to said composite color television signal and operating in phase with said first quadrature phased component for deriving said first tinting signal from said color subcarrier wave; means responsive to said composite color television signal and operating in phase with said second quadrature phased component for deriving said second tinting signal from said color subcarrier wave; means for utilizing said luminosity signal portion of said composite color television signal; an intercoupling network having three input circuits, a plurality of output circuits and mixing means effectively interconnecting each of said input circuits to each of said output circuits for producing at said output circuits any selected amplitude and polarity of a signal applied to any of said input circuits; means for applying said luminosity and tinting signals respectvely to the three input circuits of said intercoupling network; signal combining means including said intercoupling network mixing means for combining selected relative amplitudes and polarities of said luminosity and one of said tinting signals to produce signals representative of said second red-green and said green-blue combinations of the component colors of the object; and said signal combining means including said intercoupling network mixing means for combining selected relative amplitudes and polarities of said luminosity and both of said tinting signals to produce signals representative of said red, green and blue component colors of the object.

21. In a color television system in which the color of an object is represented by a color subcarrier wave having two quadrature phased components, a first one of said quadrature phased components being modulated with a first signal representing color information of the object and having signal frequencies up to a first frequency, and the second one of said quadrature phased components being modulated with a second signal representing color information of the object and having signal frequencies up to a second frequency higher than said first frequency, the combination including: a first modulating circuit conveying said first signal and including a modulator operating in phase with said first quadrature phased component; a second modulating circuit conveying second second signal and including a modulator operating in phase with said second quadrature phased component; first frequency limiting means connected in said first modulating circuit for restricting said first signal to a first band of frequencies up to said first frequency and having a substantially uniform amplitude response throughout said first frequency band; second frequency limiting means connected in said second modulating circuit for restricting said second signal to a second band of frequencies up to said second frequency and having a first substantially uniform amplitude response throughout said first frequency band and a second substantially uniform amplitude response throughout the remainder of said second frequency band higher than said first frequency band, said second amplitude response being greater than either of said amplitude responses in said first frequency band.

22. In a color television receiver adapted to receive a composite color television signal including a luminosity signal and a color subcarrier wave having two quadrature phased components, a first one of said quadrature phased components being modulated with a first tinting signal representative of the colors of an object and having frequencies up to a first frequency, the second one of said quadrature phased components being modulated with a second tinting signal representative of the colors of the object and having frequencies up to a second frequency higher than said first frequency, the combination including: a first modulating circuit responsive to said composite color television signal and operating in phase with said first quadrature phased component for deriving said first tinting signal from said color subcarrier wave; first frequency limiting means connected in said first modulating circuit for restricting said derived first tinting signal to frequencies up to said first frequency; a second modulating circuit responsive to said composite color television signal and operating in phase with said second quadrature phased component for deriving said second tinting signal from said color subcarrier wave; second frequency limiting means connected in said second modulating circuit for restricting said derived second tinting signal to frequencies up to said second frequency; a circuit coupled to said signal receiving means for utilizing said luminosity signal portion of said composite color television signal; and respective time delay means connected in said luminosity signal and second demodulating circuits to compensate for the delay of said first tinting signal by said first frequency limiting means.

23. In a color television receiver adapted to receive a composite color television signal including a color subcarrier wave modulated with a tinting signal representative of the colors of an object and having frequencies up to a given frequency, the combination including: a modulating circuit responsive to said composite television signal to derive said tinting signal from said color subcarrier wave; a modulator having an input circuit and an output circuit connected in said modulating circuit; first frequency limiting means connected in the input circuit of said modulator for restricting said modulated subcarrier wave impressed upon said modulator to frequencies above a frequency substantially equal to the difference between said subcarrier wave frequency and said tinting signal frequency; and second frequency limiting means connected in the output circuit of said modulator for restricting said tinting signal derived from said modulator to frequencies up to said tinting signal frequency.

24. In a color television system in which the color of an object is represented by a color subcarrier wave of a first given frequency and modulated with a tinting signal representative of the colors of the object and having frequencies up to a second given frequency, the combination including: a modulating channel including a modulator having an input circuit and an output circuit; a source of two waves of said subcarrier wave frequency, said two waves having an opposite phase relationship to one another; means for operatively impressing one of said waves upon said modulator; first frequency limiting means connected in a first one of the circuits of said modulator to restrict signals in said one circuit to frequencies up to said given tinting signal frequency; second frequency limiting means connected in the other circuit of said modulator to restrict signals in said other circuit to frequencies above a frequency substantially equal to the difference between said subcarrier wave frequency and said given tinting signal frequency; and means operatively impressing said oppositely phased wave upon the second one of the circuits of said modulator.

25. In a color television receiver adapted to receive a composite color television signal including a color subcarrier wave of a given frequency and having two quadrature phased components, a first one of said quadrature phased components being modulated with a first tinting signal representative of the colors of an object and having frequencies up to a first maximum frequency, the second one of said quadrature phased components being modulated with a second tinting signal representative of the colors of the object and having frequencies up to a second maximum frequency higher than said first maximum frequency, the combination including: a first modulating circuit responsive to said composite television signal and operating in phase with said first quadrature phased component for deriving said first tinting signal from said color subcarrier wave; first frequency limiting means connected in said first modulating circuit for restricting said derived first tinting signal to frequencies up to said first maximum frequency; a second modulating circuit responsive to said composite television signal and operating in phase with said second quadrature phased component for deriving said second tinting signal from said color subcarrier wave; second frequency limiting means connected in said second modulating circuit for restricting said derived second tinting signal to frequencies up to said second maximum frequency; and third frequency limiting means operatively connected in both of said modulating circuits for restricting said quadrature phased components to frequencies above a frequency substantially equal to the difference between said subcarrier wave frequency and said maximum frequency of said second tinting signal.

26. In a color television receiver adapted to receive a composite color television signal including a color subcarrier wave of a given frequency and having two quadrature phased components, a first one of said quadrature phased components being modulated with a first tinting signal representative of the colors of an object and having frequencies up to a first maximum frequency, the second one of said quadrature phased components being modulated with a second tinting signal representative of the colors of the object and having frequencies up to a second maximum frequency higher than said first maximum frequency, the combination including: a first modulating circuit responsive to said composite color television signal and operating in phase with said first quadrature phased component for deriving said first tinting signal from said color subcarrier wave; first frequency limiting means connected in said first modulating circuit for restricting said derived first tinting signal to frequencies up to said first maximum frequency; a second modulating circuit responsive to said composite color television signal and operating in phase with said second quadrature phased component for deriving said second tinting signal from said color subcarrier wave; second frequency limiting means connected in said second modulating circuit for restricting said derived second tinting signal to frequencies up to said second maximum frequency; third frequency limiting means operatively connected in both of said demodulating circuits for restricting said quadrature phased components to frequencies above a frequency substantially equal to the difference between said subcarrier wave frequency and said maximum frequency of said second tinting signal; and time delay means connected in said second demodulating circuit to compensate for the difference in the time delay of said first and second tinting signals caused by said first frequency limiting means.

27. In a color television receiver adapted to receive a composite color television signal including a luminosity signal and a color subcarrier wave of a given frequency and having two quadrature phased components, said luminosity signal including selected relative amplitudes of a plurality of signals representative of the component colors of an object, a first one of said quadrature phased components being modulated with a first tinting signal including selected relative amplitudes and polarities of a plurality of said signals representative of the colors of the object and having frequencies up to a first maximum frequency, the second one of said quadrature phased components being modulated with a second tinting signal including other selected relative amplitudes and polarities of a plurality of said signals representative of the colors of the object and having frequencies up to a second maximum frequency higher than said first maximum frequency, the combination including: a first modulating circuit responsive to said composite color television signal and operating in phase with said first quadrature phased component for deriving said first tinting signal from said color subcarrier wave; first frequency limiting means connected in said first modulating circuit for restricting said derived first tinting signal to frequencies up to said first maximum frequency; a second modulating circuit responsive to said composite color television signal and operating in phase with said second quadrature phased component for deriving said second tinting signal from said color subcarrier wave; second frequency limiting means connected in said second modulating circuit for restricting said derived second tinting signal to frequencies up to said second maximum frequency; third frequency limiting means operatively connected in both of said modulating circuits for restricting said quadrature phased components to frequencies above a frequency substantially equal to the difference between said subcarrier wave frequency and said maximum frequency of said second tinting signal; a circuit for utilizing said luminosity signal portion of said composite color television signal; time delay means connected in said luminosity circuit to compensate for the difference in the time delay of said luminosity and first tinting signals caused by said first frequency limiting means; and an intercoupling network operatively connected to said two demodulating circuits and to said luminosity signal circuit for combining selected relative amplitudes and polarities of said luminosity and tinting signals to produce signals representative of said component colors of the object.

References Cited in the file of this patent

UNITED STATES PATENTS

| | | |
|---|---|---|
| 1,722,274 | Clark et al. | July 30, 1929 |
| 1,769,920 | Gray | July 8, 1930 |
| 2,256,317 | Earp | Sept. 16, 1941 |
| 2,423,769 | Goldsmith | July 8, 1947 |
| 2,513,159 | Fredendall | June 27, 1950 |
| 2,558,489 | Kalfaian | June 26, 1951 |
| 2,580,903 | Evans | Jan. 1, 1952 |
| 2,627,549 | Kell | Feb. 3, 1953 |
| 2,728,813 | Loughlin | Dec. 27, 1955 |
| 2,773,929 | Loughlin | Dec. 11, 1956 |
| 2,774,072 | Loughlin | Dec. 11, 1956 |